(12) United States Patent
Wenzel et al.

(10) Patent No.: US 12,443,789 B2
(45) Date of Patent: *Oct. 14, 2025

(54) SYSTEM AND METHOD FOR GENERATING AND PUBLISHING ELECTRONIC CONTENT FROM PREDETERMINED TEMPLATES

(71) Applicant: 1206881 Alberta Ltd., Edmonton (CA)

(72) Inventors: Jacqueline A. Wenzel, West Wickham (GB); Stephen A. Wenzel, Canmore (CA); Holly M. Brattberg, Canmore (CA); Susan K. Brattberg, Calgary (CA)

(73) Assignee: 1206881 Alberta Ltd., Edmonton (CA)

( * ) Notice: Subject to any disclaimer, the term of this patent is extended or adjusted under 35 U.S.C. 154(b) by 102 days.

This patent is subject to a terminal disclaimer.

(21) Appl. No.: 18/331,219

(22) Filed: Jun. 8, 2023

(65) Prior Publication Data
US 2024/0012989 A1    Jan. 11, 2024

Related U.S. Application Data

(63) Continuation of application No. 15/168,160, filed on May 30, 2016, now Pat. No. 11,714,958, which is a
(Continued)

(51) Int. Cl.
*G06F 40/186* (2020.01)
*G06F 40/106* (2020.01)
(Continued)

(52) U.S. Cl.
CPC .......... *G06F 40/186* (2020.01); *G06F 40/106* (2020.01); *G06Q 30/02* (2013.01); *G06F 40/58* (2020.01)

(58) Field of Classification Search
CPC .... G06F 40/186; G06F 40/106; G06F 17/248; G06Q 30/02
See application file for complete search history.

(56) References Cited

U.S. PATENT DOCUMENTS

| 6,898,601 B2 | 5/2005 | Amado et al. |
| 2002/0073125 A1* | 6/2002 | Bier ............ G06F 40/166 715/255 |

(Continued)

FOREIGN PATENT DOCUMENTS

| CA | 2813817 A1 | 4/2013 |
| WO | 2005055174 A1 | 6/2005 |
| WO | 2013040107 A1 | 3/2013 |

OTHER PUBLICATIONS

Office Action issued in corresponding CA Application No. 2,932,024; dated Mar. 24, 2022.
(Continued)

*Primary Examiner* — Asher D Kells
(74) *Attorney, Agent, or Firm* — CPST Intellectual Property Inc.; Brett J. Slaney

(57) ABSTRACT

A system and method are provided for generating and publishing electronic content using predetermined templates. The method comprises providing a predetermined template specifying a predetermined layout for at least one slide to contain content; enabling the content to be added to the template by a plurality of contributors, each contributor having access to a project comprising the template over a network; receiving the content; and compiling a published output according to the received content and parameters of the predetermined template.

20 Claims, 25 Drawing Sheets

Related U.S. Application Data continuation of application No. PCT/CA2014/051148, filed on Dec. 1, 2014.

(60) Provisional application No. 61/910,241, filed on Nov. 29, 2013.

(51) Int. Cl.
  *G06F 40/58* (2020.01)
  *G06Q 30/02* (2023.01)

(56) References Cited

U.S. PATENT DOCUMENTS

| | | |
|---|---|---|
| 2002/0178181 A1 | 11/2002 | Subramanyan et al. |
| 2002/0188583 A1 | 12/2002 | Rukavina et al. |
| 2003/0084345 A1 | 5/2003 | Bjornestad et al. |
| 2004/0043362 A1 | 3/2004 | Aughenbaugh et al. |
| 2005/0039119 A1* | 2/2005 | Parks .................. G06F 40/174 715/209 |
| 2005/0108619 A1 | 5/2005 | Theall et al. |
| 2006/0204943 A1 | 9/2006 | Kimball |
| 2007/0061384 A1 | 3/2007 | Harrington et al. |
| 2007/0218448 A1 | 9/2007 | Hameyer |
| 2008/0022107 A1 | 1/2008 | Pickles et al. |
| 2008/0108025 A1 | 5/2008 | Menell |
| 2008/0201386 A1 | 8/2008 | Maharajh et al. |
| 2009/0172005 A1* | 7/2009 | LaToza ................ G06F 40/186 707/999.102 |
| 2009/0254802 A1 | 10/2009 | Campagna et al. |
| 2009/0287990 A1 | 11/2009 | Lynton et al. |
| 2010/0004969 A1 | 1/2010 | Menear et al. |
| 2011/0065082 A1 | 3/2011 | Gal et al. |
| 2011/0264705 A1 | 10/2011 | Diamond |
| 2011/0307818 A1 | 12/2011 | Eby et al. |
| 2012/0016655 A1 | 1/2012 | Travieso et al. |
| 2012/0129141 A1 | 5/2012 | Granpeesheh |
| 2012/0192055 A1 | 7/2012 | Antebi et al. |
| 2012/0272140 A1 | 10/2012 | Hanechak |
| 2013/0019028 A1 | 1/2013 | Myers et al. |
| 2013/0097115 A1 | 4/2013 | Savage |
| 2013/0124186 A1 | 5/2013 | Donabedian et al. |
| 2013/0124987 A1 | 5/2013 | Lakritz |
| 2013/0318589 A1 | 11/2013 | Ford et al. |
| 2015/0026594 A1* | 1/2015 | Dave .................. G06Q 50/01 715/753 |
| 2016/0065627 A1 | 3/2016 | Pearl |

OTHER PUBLICATIONS

International Search Report from PCT Application No. PCT/CA2014/051148; search completed Feb. 27, 2015.
International Search Report from PCT Application No. PCT/CA2014/051149; search completed Feb. 19, 2015.
International Search Report from PCT Application No. PCT/CA2014/051150; search completed Jan. 21, 2015.
Chau, S.; International Search Report from PCT Application No. PCT/CA2014/051151; search completed Jan. 21, 2015.
Zhan, Q.; "Workflow Technology Enabled e-Training System: Toward Work Process"; May 2009; International Symposium on Information Engineering and Electronic Commerce; pp. 197 to 201; IEEE.
Sadiq, S. et al.; "Workflow Driven e-Leaning: Beyond Collaborative Environments"; 2002; School of Computer Science and Electrical Engineering, Distributed Systems Technology Center, the University of Queensland, Australia.
Supplemental European Search Report issued in correspondign European Patent Application No. 14866383.4; search completed Jun. 21, 2017.
European Examination Report issued in corresponding EP Application No. 14866383.4; dated Oct. 29, 2020.

* cited by examiner

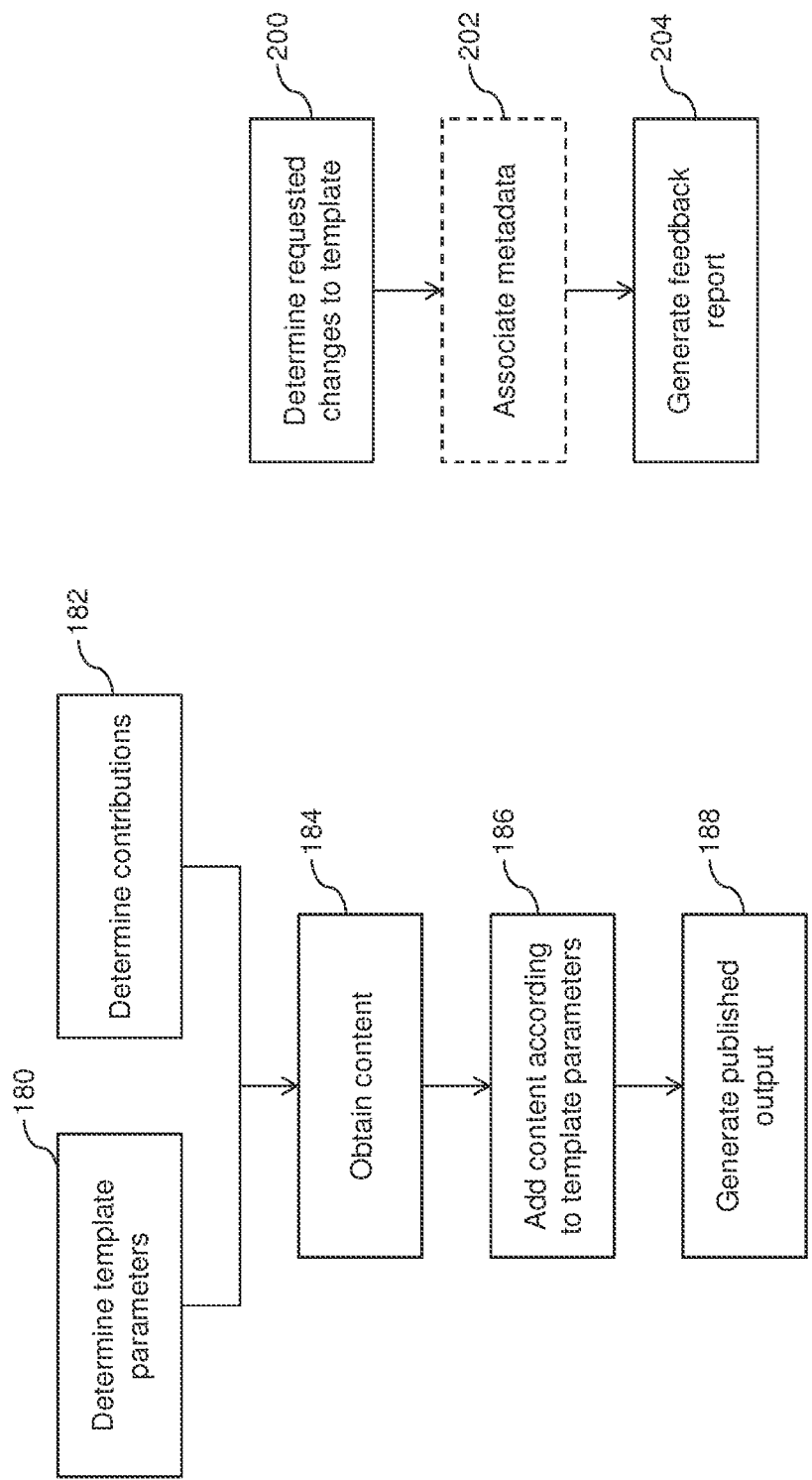

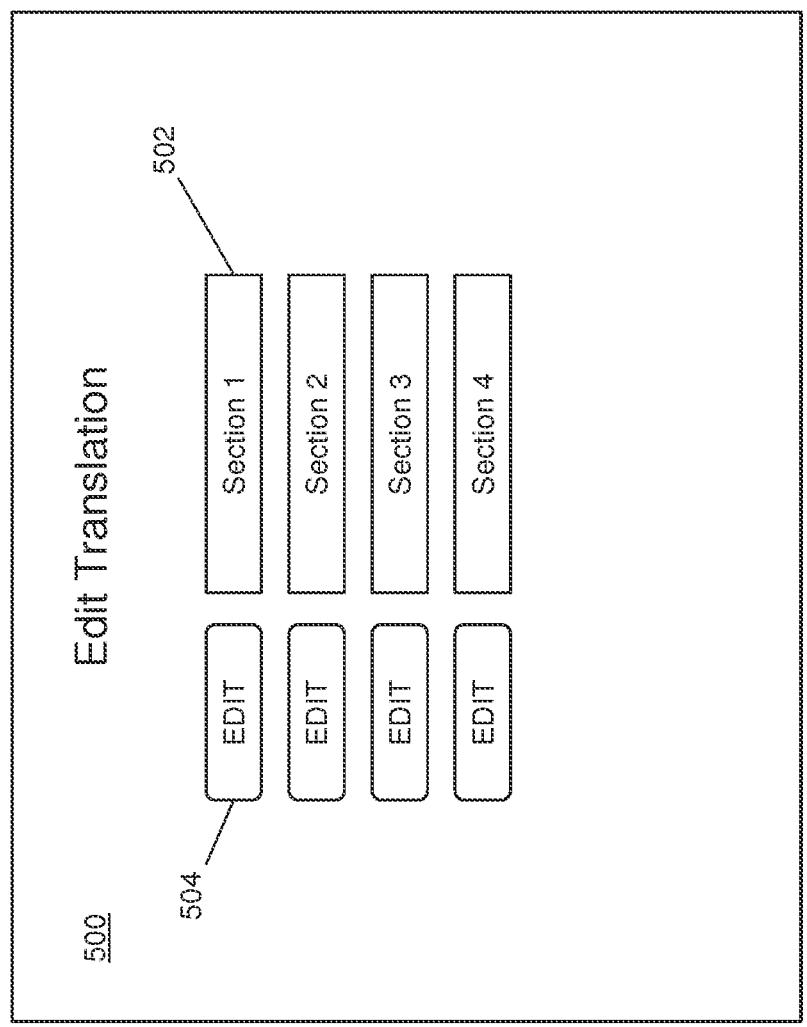

SYSTEM AND METHOD FOR GENERATING AND PUBLISHING ELECTRONIC CONTENT FROM PREDETERMINED TEMPLATES

CROSS-REFERENCE TO RELATED APPLICATIONS

This application is a continuation of U.S. patent application Ser. No. 15/168,160 filed on May 30, 2016, which is a continuation of PCT Patent Application No. PCT/CA2014/0511148 filed on Dec. 1, 2014, which claims priority to U.S. Provisional Patent Application No. 61/910,241 filed on Nov. 29, 2013, the entire contents of these application being incorporated herein by reference in their entirety.

TECHNICAL FIELD

The following relates to systems and methods for generating and publishing electronic content from predetermined templates.

DESCRIPTION OF THE RELATED ART

Generating and publishing electronic content can be time consuming, particularly when the content is to be presented in a specific way in order to have a desired or otherwise beneficial effect. For example, content for electronic training (e-training) or electronic learning (e-learning) often required consideration of what type of content is included, in what order, and in what fashion. Typically, this is a manual process based on inputs from a client or customer, previous experience, and previous work.

With such manual processes, each contributor provides input and this often leads to several iterations and the associated time to "pass around" drafts until the project is completed.

It is therefore an object of the following to address the above-noted disadvantages.

SUMMARY

In one aspect, there is provided a method of generating electronic content, the method comprising: providing a predetermined template specifying a predetermined layout for at least one slide to contain content; enabling the content to be added to the template by a plurality of contributors, each contributor having access to a project utilizing the template over a network; receiving the content; and compiling a published output according to the received content and parameters of the predetermined template.

Computer readable media and server devices are also provided for performing the method.

BRIEF DESCRIPTION OF THE DRAWINGS

Embodiments will now be described by way of example only with reference to the appended drawings wherein:

FIG. 9 is a flow chart illustrating computer executable instructions that may be performed in generating a published output using contributed content;

FIG. 10 is a flow chart illustrating computer executable instructions that may be performed in providing feedback according to requested changes to a template;

FIG. 26 is an example of a translation editing tool user interface.

DETAILED DESCRIPTION

Figure 1:
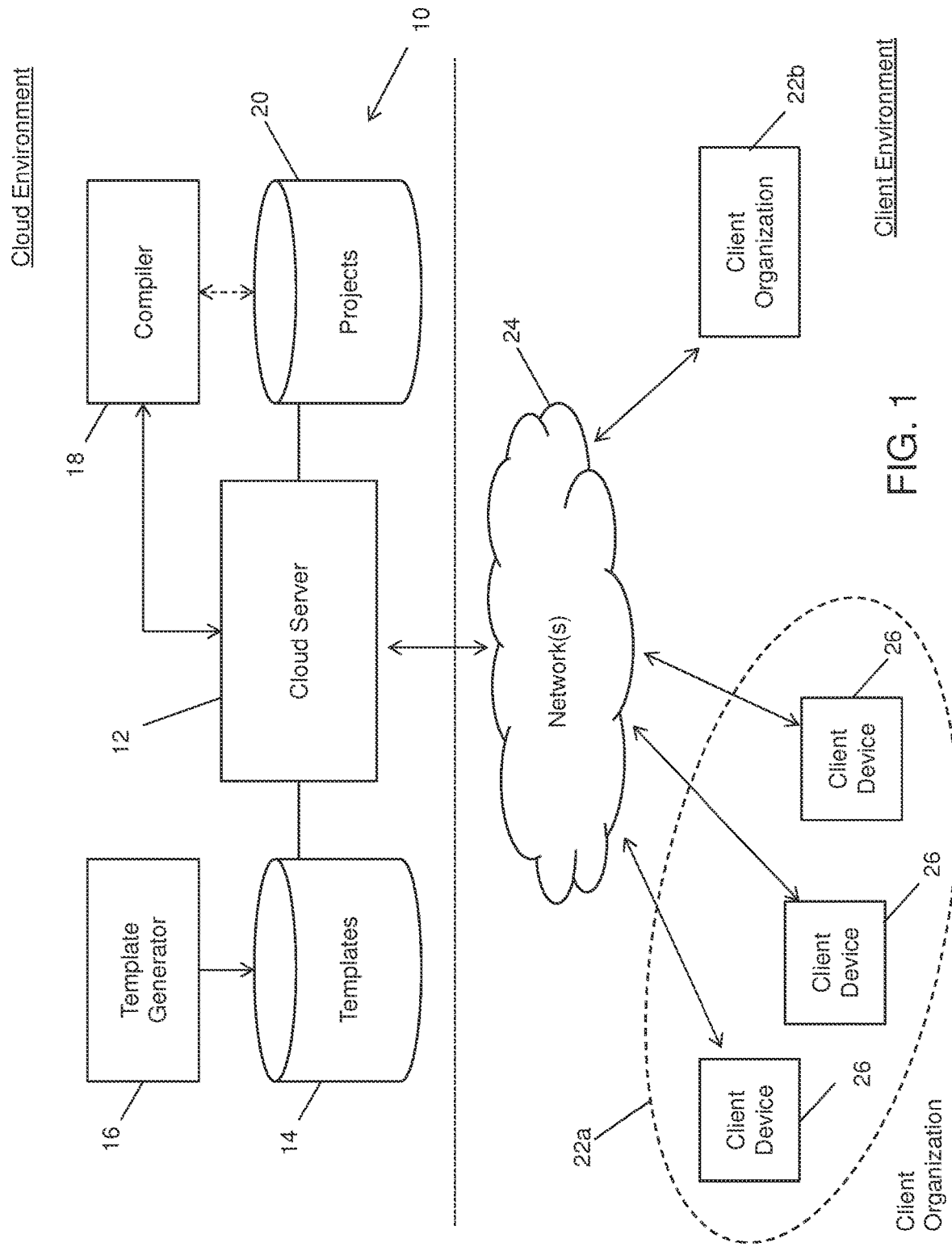
FIG. 1 is a block diagram of an example of a cloud based system for generating and publishing electronic content from predetermined templates.

It has been found that the generation and publication of electronic content, particularly content where the form and presentation is paramount, can be facilitated by providing a library or collection of predetermined templates that enable one or more collaborative contributors to conveniently add or associate content to/with predetermined portions of the template, in a "storyboarding" manner. It has also been found that providing access to these templates in a cloud or otherwise networked or distributed environment enables multiple collaborators in multiple locations to contribute to a project in a way that facilitates rapid development of electronic content. Following the collaboration, the project can be published in an automated manner by compiling the contributed content, according to parameters of the template.

The principles discussed herein have been found to be particularly advantageous for e-Training projects, however, it can be appreciated that these principles equally apply to, without limitation:

- e-Learning—where the methodology for the predetermined templates is based on instructional design and educational psychology.
- Interactive Sales & Marketing—where the methodology for the predetermined templates is based on marketing and sales psychology.
- Collaborative generation of storyboards—for marketing, websites, interactive video, internal communications, etc.
- Dissemination of knowledge post conference—for capturing conference materials and presentations for technology based communication post-conference.

For example, sales presentations require travel and face-to-face demonstrations. These can be replaced not with just video, but with multi-modal interactive marketing presentations similar to how e-Learning has evolved. Similar context can be applied where education and sharing of knowledge and information is involved.

Using the predetermined templates described herein, which are based at least in part on expertise and experience for the underlying type of output, organizations can develop, for example, training material comprising any one or more of text, audio, video, simulations or any file or content/media type. In the e-Learning example, the learning materials can be published quickly and conveniently into a secure and scalable course, following the proven and tested templates, which match the learning objectives and outcomes identified. The templates balance the competing objectives of providing flexibility to the organization creating the output, and the system maintaining control over the structure and functionality of the template. In this way, the organization can be involved in the development process from knowledge capture, input development and storyboarding perspectives.

The system described herein is configured to facilitate three phases to a project, namely a behind the scenes phase involving methodology and processes to generate predetermined templates that guide the contributors into adding content in a desired way, a collaboration stage that enable convenient storyboarding through a cloud-based project hosted by the system, and a compilation and publishing stage that automates the generation of the final output based on the contributed content and the parameters of the template (determined in the previous phases).

In the first phase, the methodology can be developed over time and harnessed to create a collection of templates by applying, for example, advanced learning principles to create technology based e-Training templates. Previous experiences in asynchronous learning can be leveraged to develop connections and understanding between learning objectives—technology based delivery—learning outcomes. The processes in the first stage involve applying production line style to course development. Specialization of tasks can also be applied to create input items (e.g., audio, video, text, image, file, simulation, etc.). In this way, the predetermined templates lend themselves to the collaboration and compilation processes for inserting independent items into storyboard and template.

In the second phase, collaborative storyboarding allows for inputs to be "dragged and dropped", uploaded, copied and pasted, etc., into a secure cloud based server. This allows collaborators to view and edit as authorized. Files and projects can thus be compiled by one or many compilers, using manual processes or using automated processes. Multiple individuals can log in and upload simultaneously creating a collaborative workflow.

In the third phase, automated compiling is applied for publishing, e.g., using an automated content generator. Taking independent input items and publishing them into an end template is therefore accomplished through automated processes.

The system described herein provides several advantages, including the ability to collaborate between specialists, experts, contributors, authors, publishers, compilers, writers, and with customer and custom development contractor/publisher. Moreover, all participants can be involved in the development process. The system also allows for the visualization of compiled final products by contributors, compilers and customers, and provides for an efficiency of development, e.g., by removing several communication, project management and technical integration steps. In at least one embodiment, the system can provide cloud-based access to projects thus eliminating the need for the users to install specialized software. The system can also remove the need for end users to learn multiple software programs and learning methodologies that would otherwise be required to create templates. The system also allows end user scalable and secure access to templates based on established learning methodology.

The system also enables the contractor or administrator to remain in control of learning methodology. The templates provided can be limited to those having demonstrated effectiveness, and additional templates can be created for various learning objectives and outcomes. A framework for knowledge capture is also provided, where input files are matched to learning objectives. The modular or "bite sized" approach to the storyboarding process urges end users to break complex explanations out into: 1. Bullet points or "slides" within the template; 2. Filling in the substance of those bullet points using limited words and precise files to further illustrate the point. Moreover, knowledge capture can be completed through audio or video recording and transcribed into input files by another contributor.

Template Generator and Cloud Collaboration

Turning now to the figures, FIG. 1 illustrates an automated electronic content generation and publication system (the "system 10"). The system 10 includes a cloud-based server (cloud server 12), which includes or otherwise has access to a collection or library of predetermined/pre-generated templates 14. The templates 14 in this example are created by a template generator 16, which represents and software, hardware, processes, and inputs utilized to generate a template. The template generator 16 may therefore represent the tools utilized by a specialist or team of specialists for a particular application, e.g., e-Learning, e-Training, marketing, etc. The cloud server 12 also includes or otherwise has access to a compiler 18 that is configured, programmed, and operable to incorporate contributed content into a published output according to parameters, constraints, and criteria associated with the templates 14 being used. The cloud server 12 also includes or otherwise has access to a database of projects 20 that are stored in the cloud environment such that multiple collaborators can access and work with the templates to create various projects.

As shown in FIG. 1, the cloud server 12 is accessible to entities, referred to as "organizations" 22 herein, via one or more networks 24. The one or more networks 24 may include cellular or internet based networks or any other communication link or connection allowing a client device 26 to access the cloud server 12. The client organization 22 can include an organization with any one or more collaborators. For example, FIG. 1 illustrates a first client organization 22a having multiple collaborators using respective client devices 26, e.g. desktop computers, tablets, smartphones, etc. FIG. 1 also illustrates a second client organization 22b with a single collaborator. The client environment may therefore include various types of client organizations that can allow any one or more collaborators in any number of locations, e.g., geographically separated locations.

Figure 2:
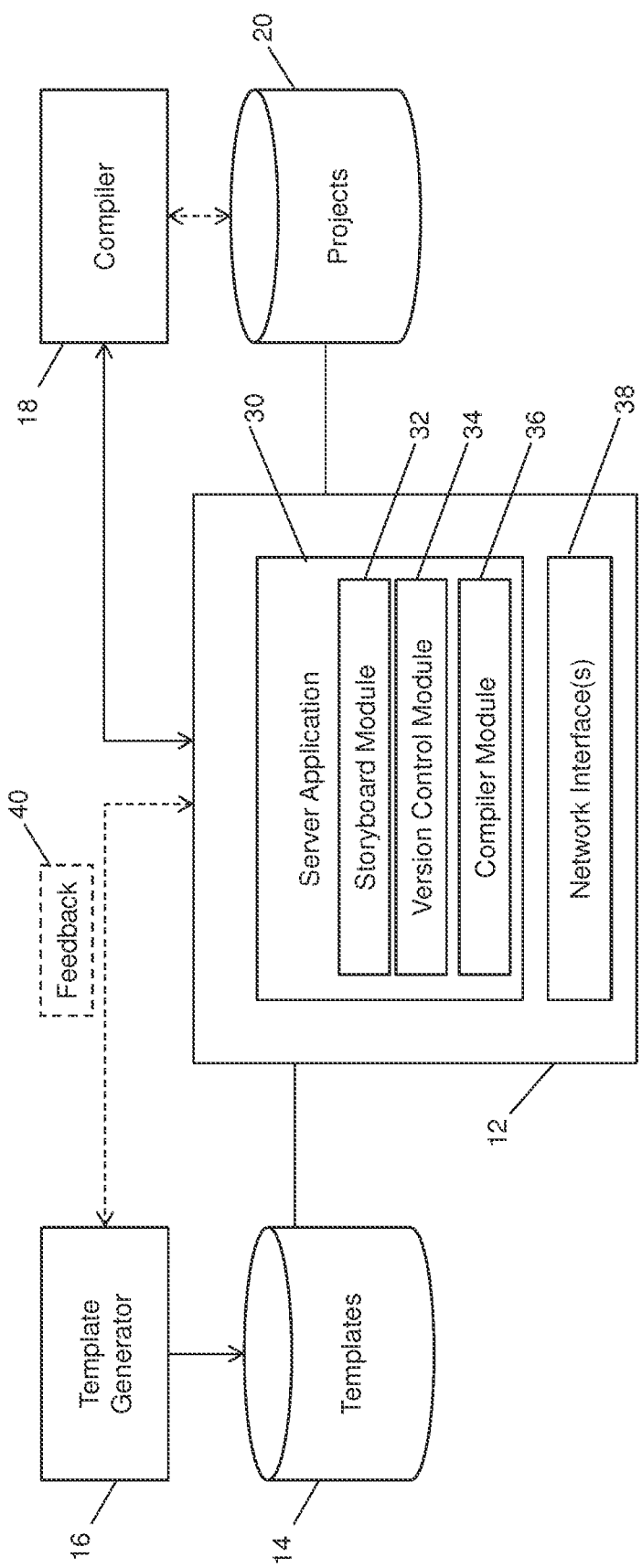
FIG. 2 is a block diagram of an example of a configuration for a cloud server.

FIG. 2 illustrates an example of a configuration for the cloud server 12. In this example, the cloud server 12 includes a server application 30 that includes various functionalities, such as a storyboard module 32 to allow users to create projects using templates according to a storyboarding process, a version control module 34 to facilitate multiple collaborators and resolve collisions if they should occur, and a compiler module 36 for interfacing with the compiler 18 to generate the published output. FIG. 2 also illustrates that feedback 40 can be generated by the cloud server 12 and provided to the template generator 16, e.g. according to requested changes to a template used by a client organization 22.

Figure 3:
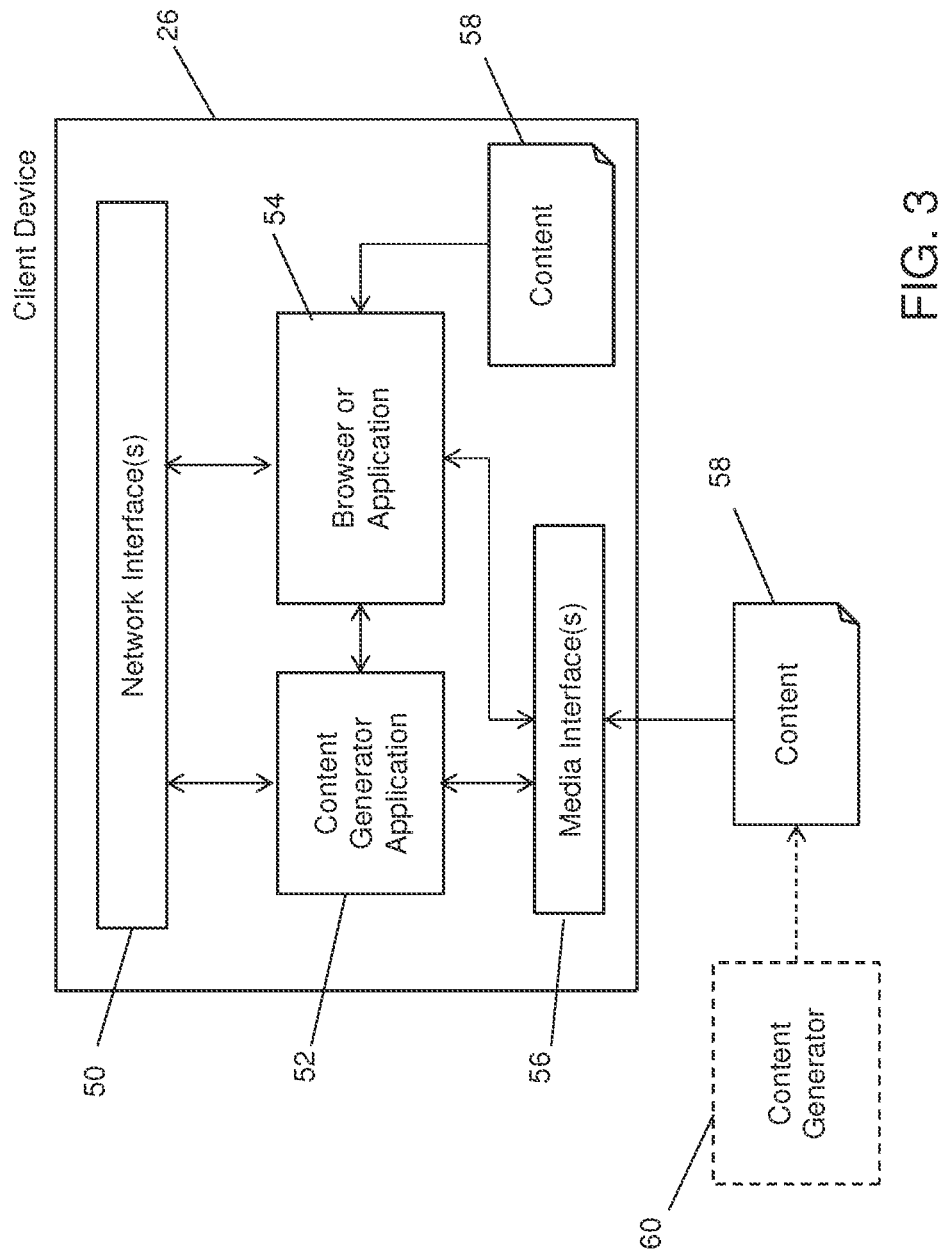
FIG. 3 is a block diagram of an example of a contributor device.

FIG. 3 illustrates an example of a configuration for a client device 26. The client device 26 includes one or more network interfaces 50 to enable the client device 26 to connect to the cloud server 12 via the one or more networks 24. The client device 26 also includes a content generator application 52 in this example, e.g. a text editor or word processor, camera, etc. Also shown is a browser or application 54 that is used to provide a user interface hosted by the cloud server 12, e.g. by accessing a secure website. As shown, content 58 can be generated and/or accessible from on the client device 26 or can be loaded into the client device 26, e.g. via a media interface 56. Also, an external content generator 60 (e.g. camera, other computer) can be used to generate such content 58.

Figure 4A:
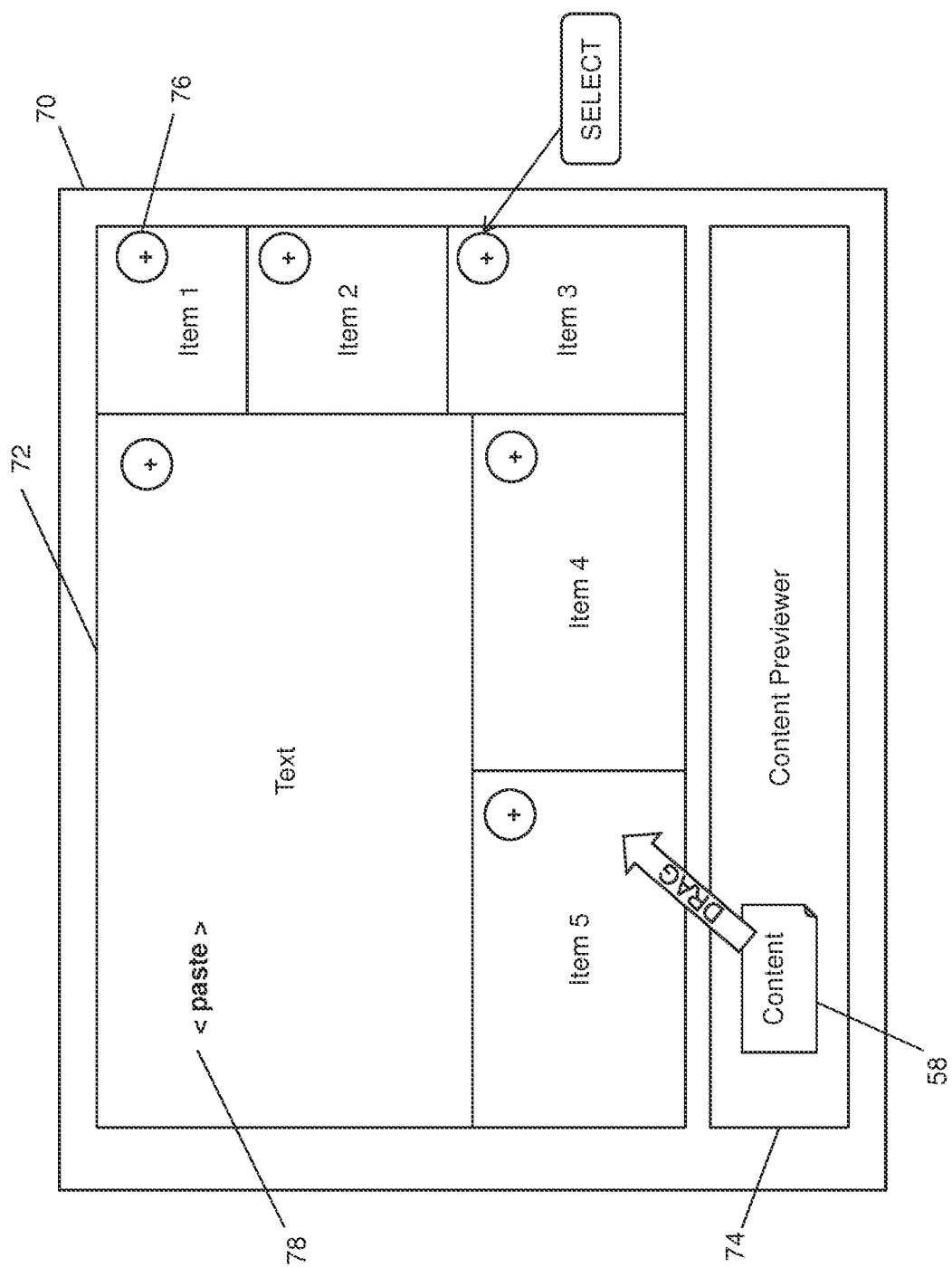
FIG. 4(a) is an example of a configuration for a template.
Figure 4B:
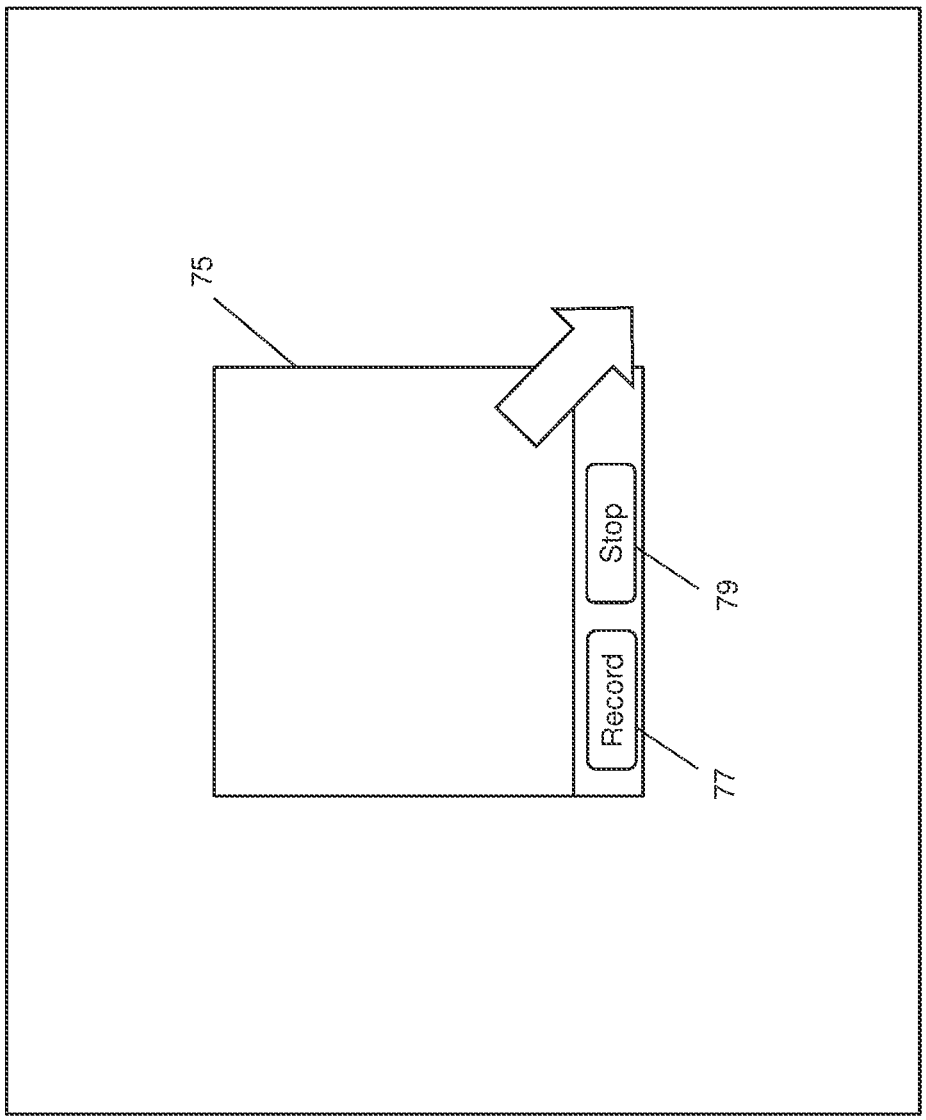
FIG. 4(b) is an example of a resizable box for defining an area for screen recording and/or screen shot capturing.

FIG. 4(*a*) illustrates an example of a configuration for a user interface 70 that can be used to interact with a template 14. In this example, the user interface 70 includes a template portion 72 and a content previewer 74. The template portion 72 provides a number of item sections, in this example five. Each section may include an addition symbol 76 for initiating an upload of content 58. The content 58 may also be dragged from the content previewer portion 74 (or another open window) into an item, or a "paste" function can be applied. The content is then uploaded to the cloud server 12 wherein a link such as a URL is embedded in the template for others to access the uploaded content. Alternatively, the template portion's item sections can be embedded with a record and/or capture option (e.g., menu option, button, etc.), which when selected begins a capture process. For video, selecting a record option can be used to begin recording a screen (e.g., for a demo). For example, by pressing the addition symbol 76 or a record option (e.g., from a menu), a resizable box 75 can be displayed as shown in FIG. 4(*b*) to enable the user to define the area which they wish to capture in the recording. The user may then minimize windows and other objects on their screen such that only the content they wish to record is visible. A record button 77 can then be used to initiate the video screen capture recording. Once the recording is complete, a stop button 79 can be selected, after which the user interface 70 can re-expand. Upon saving the recording, the video is uploaded to a streaming module on the cloud server 12 and a link automatically embedded into the template by the cloud server 12.

For screen shots, a similar workflow can be created by embedding a capture or screen shot option into the user interface 70 such that by selecting the option, a screen shot is taken using a resizable box 75, which then automatically saves the image to the cloud server 12 and appears within the template as viewed by other client devices 26. Similarly, audio recordings can be captured directly within the template generator 16 by allowing a record option to be selected and audio to be captured and immediately saved to the cloud server 12 with the recorded audio embedded within the template 14.

Since the template user interface 70 is based on a predetermined template, multiple instances of the user interface 70 can be made available via the cloud server 12 to multiple collaborators such that the collaborators are dynamically working on generating the same output. The cloud server 12 can also control versions of the work in progress to ensure that multiple edits to the same item in the same "slide" do not collide. Items that are added are uploaded or streamed to the cloud server 12 to enable the cloud server 12 to maintain an up-to-date version of the collaborated product.

Figure 5:
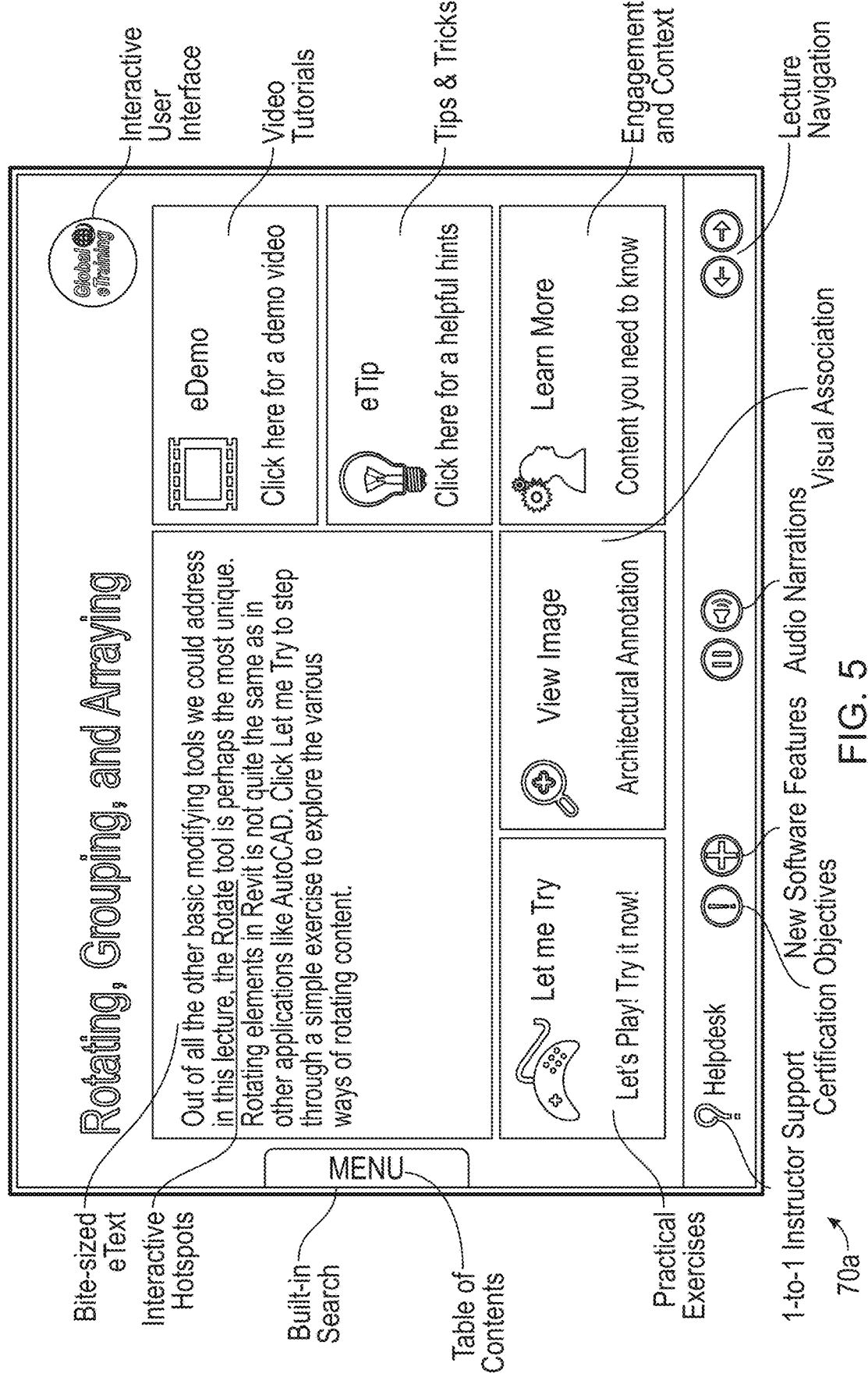
FIG. 5 is an example of a template.

FIG. 5 illustrates an example output generated according to an associated template, and various features provided therein. For example, as shown in FIG. 5, in addition to text associated with the lecture portion being shown, the template 14 can be used to build in a menu, practical exercises, enable visual associations to be accessed, additional engagement content to be accessed, tips and hints to be opened, and other media such as video for demos or tutorials. The text can also be hyperlinked to enable navigation to other content, e.g., using embedded URLs etc.

Figure 6:
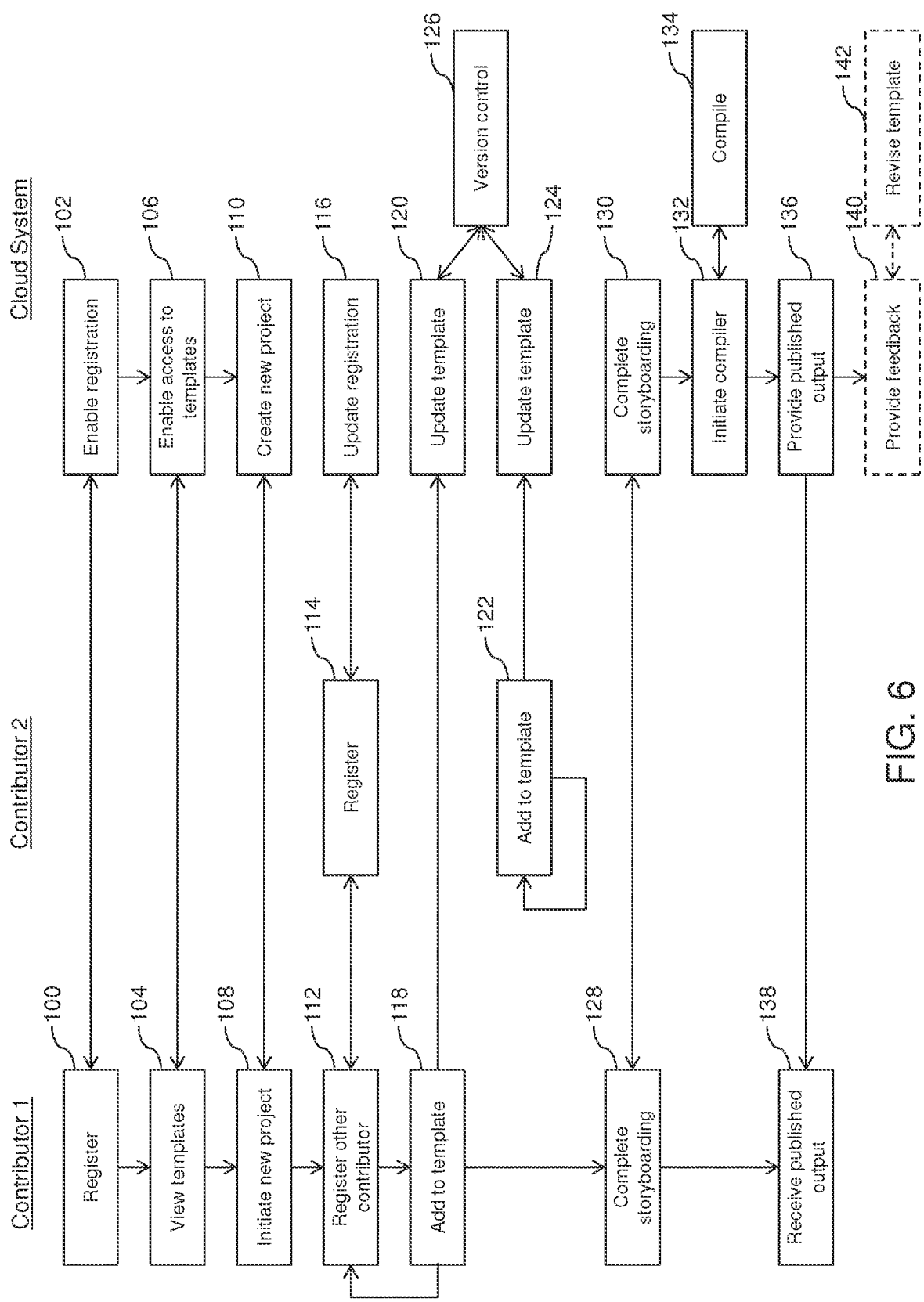
FIG. 6 is a flow chart illustrating computer executable instructions that may be performed in generating and publishing electronic content from a predetermined template.

FIG. 6 illustrates an example process flow diagram for generating a published output using a template via the system 10. At 100 a primary contributor registers with the system and the system 10 enables such a registration at 102. After registering with the system 10, the primary contributor views available templates at 104, access to which has been provided by the system 10 at 106 per the completed registration. It can be appreciated that the number and type of templates can be restricted based on an account type, industry, etc. In this example, it is assumed that the primary contributor selects an appropriate template 14 and initiates a new project at 108, which is created by the cloud server 12 at 110.

As discussed above, a plurality of contributors may contribute to the storyboarding of a project by accessing and adding content to a template 14. In this example, the primary contributor registers a secondary contributor at 112, who completes a registration at 114, causing the cloud server 12 to update the registration at 116. The primary contributor may then add content 58 to the template at 118 and the cloud server 12 updates the template in the cloud at 120. Similarly, the secondary contributor may add to the same template at 122 causing further updates to be processed by the cloud server at 124. It can be appreciated that, as shown in FIG. 6, version control steps may be performed at 126, if necessary, to resolve collisions and otherwise ensure that changes made to the template are authorized. As can be appreciated from the loops shown in FIG. 6, the primary and secondary contributors may iteratively add content to the template, e.g. in multiple sessions, using any available device, at any time, in any suitable location.

At 128 the storyboarding is completed by the primary contributor, which causes completion at the cloud server 12 at 130. It can be appreciated that the primary contributor is the entity completing the storyboarding only for illustrative purposes. At 132 the cloud server 12 initiates the compiler, which compiles the content 58 using the parameters and criteria of the template at 134, and provides a published output at 136. The published output is received by the primary contributor in this example at 138. For example, compiled software or access to the finished product may be provided to the primary contributor.

Optionally, at 140, the cloud server 12 determines that during the storyboarding, one or more of the contributors made or at least requested or attempted to change the template 14 and provides feedback to the template generator 16. This allows the template generator 16 to evaluate and, if appropriate, revise and improve upon an existing predetermined template 14 for subsequent uses at 142.

Figure 7:
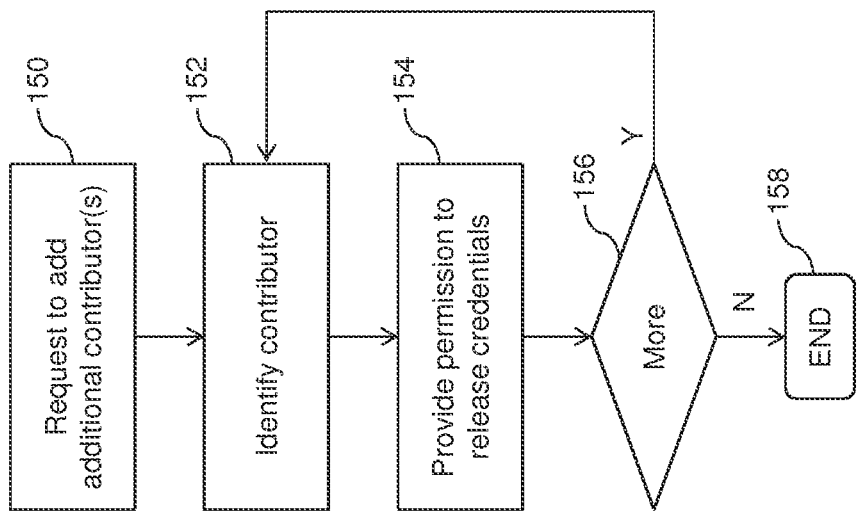
FIG. 7 is a flow chart illustrating computer executable instructions that may be performed in registering another contributor for a project.
Figure 11:
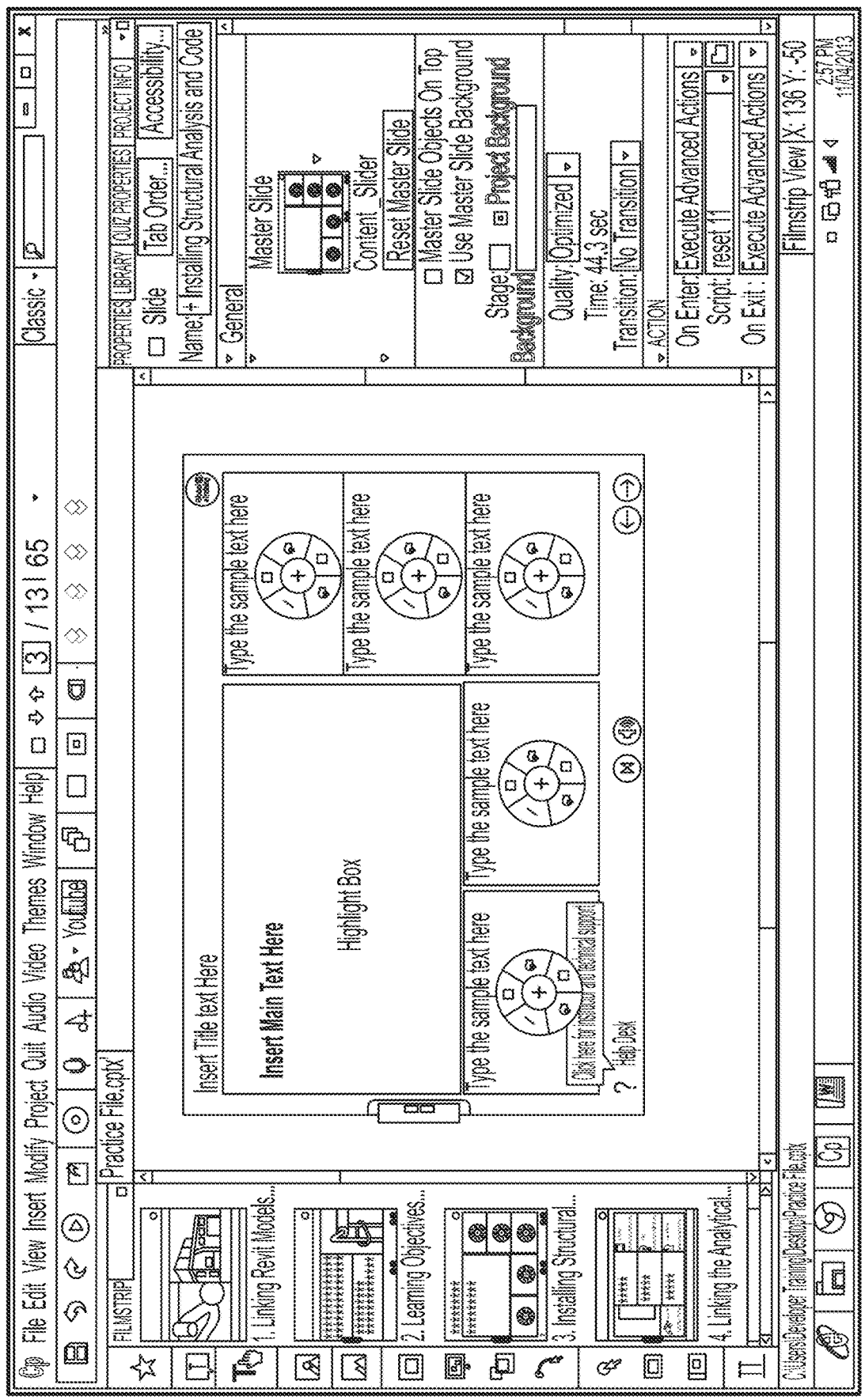
FIGS. 11 to 16 are example screen shots of a template used to storyboard a new project.

Turning now to FIG. 7, an example of a process for adding additional contributors is shown. At 150 the primary contributor submits a request to add one or more additional contributors (e.g. to add sub-accounts to a main project account). At 152 a contributor is identified, e.g. by name, email address, username, etc. and the primary contributor provides the necessary permissions to release credentials to that contributor. For example, by accepting the additional contributor, the primary contributor can cause the cloud server 12 to create an account, send an invitation email, etc. It can be appreciated that the request could also come from the potential secondary contributor, which is accepted or denied by the primary contributor. The cloud server 12 determines at 156 whether or not additional contributors are to be added. If not, the process ends at 158.

Figure 8:
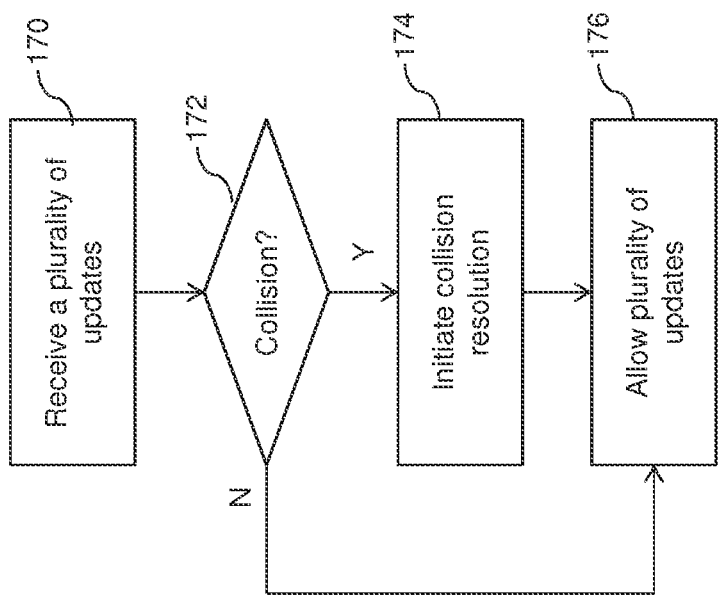
FIG. 8 is a flow chart illustrating computer executable instructions that may be performed in applying version control to multiple updates to the same project.

FIG. 8 illustrates an example process for performing version control on a storyboarded project. At 170 a plurality of updates are received and the version control module 34 determines at 172 whether or not a collision exists between at least two proposed updates/additions. If so, a collision resolution process (e.g. notifications sent to contributors, automatic priorities, etc.) is initiated at 174 before allowing the plurality of updates at 176. It can be appreciated that this allows multiple contributors to contribute at the same time, without knowledge of each other's actions, without have duplicate changes overriding each other unless authorized.

FIG. 9 illustrates an example process for compiling a published output. At 180 the parameters and criteria of the template being used are determined and the contributions of the contributors (e.g. content proposed to be added) are determined at 182. The content is then obtained at 184 (e.g. by accessing uploaded content from memory or linking to online content), and added according to the parameters of the template at 186. For example, the compiling process may involve compression, file conversion, editing, formatting and other operations to provide a consistent output. The published output is then generated at 188.

FIG. 10 illustrates a process for providing feedback to the template generator 16. At 200 the cloud server 12 determines that there were requested changes to the template being used and, if applicable, any associated metadata at 202. For example, the requested change to the template may have included an explanation or other information regarding the proposed change. A feedback report 40 may then be generated at 204, which is provided to the template generator 16 as shown in FIG. 6.

Referring now to FIGS. 11 to 16, an example of a configuration for an e-Training storyboard module 32 will now be described for illustrative purposes only.

In this example, a cloud based secure file repository is provided containing the text, video, audio and images necessary to construct slide content for use in a themed build (e.g., using Captivate). A blank template 14 is shown by way of example in FIG. 11. For the basic functionality, a user is directed to a web interface and challenged for login credentials (e.g. over https) and upon successful login, the user will be prompted to open an existing project or start a new project. If the user selects >existing project> they will be shown a list of recent and available projects. If they choose >new project> they will be shown a blank template with various options to add text, images, video and PDF URLs, etc.

For security considerations, each project has a unique identifier (ID), and this project ID will ensure all relevant project resources are accessible only to the project creator and the project manager (PM) and developer assigned to that project. A connection log is generated each time a customer accesses the project builder. A detailed, time-stamped list of uploaded resources is created for each unique login.

The following connectivity and storage service features may also be considered:

1. Unlimited number of write, read, and deleted (tracked) objects, e.g., containing from 1 byte to 5 terabytes of data each.
2. Each object is stored in a bucket and retrieved via a unique, developer-assigned key.
3. A bucket can be stored in one of several world wide regions to improve connectivity.
4. Objects stored in a Region may be controlled so as to not leave the Region unless transferred out. For example, objects stored in the EU (Ireland) Region never leave the EU.
5. The customer can provide the developer or project manager with an approved list of users. It may be noted that some cloud-based storage providers may provide authentication mechanisms to ensure that data is kept secure from unauthorized access. Objects can be made private or public, and rights can be granted to specific users based on the client supplied list. Steps should also be taken to ensure that clients do not have access to other client buckets.

Figure 12:
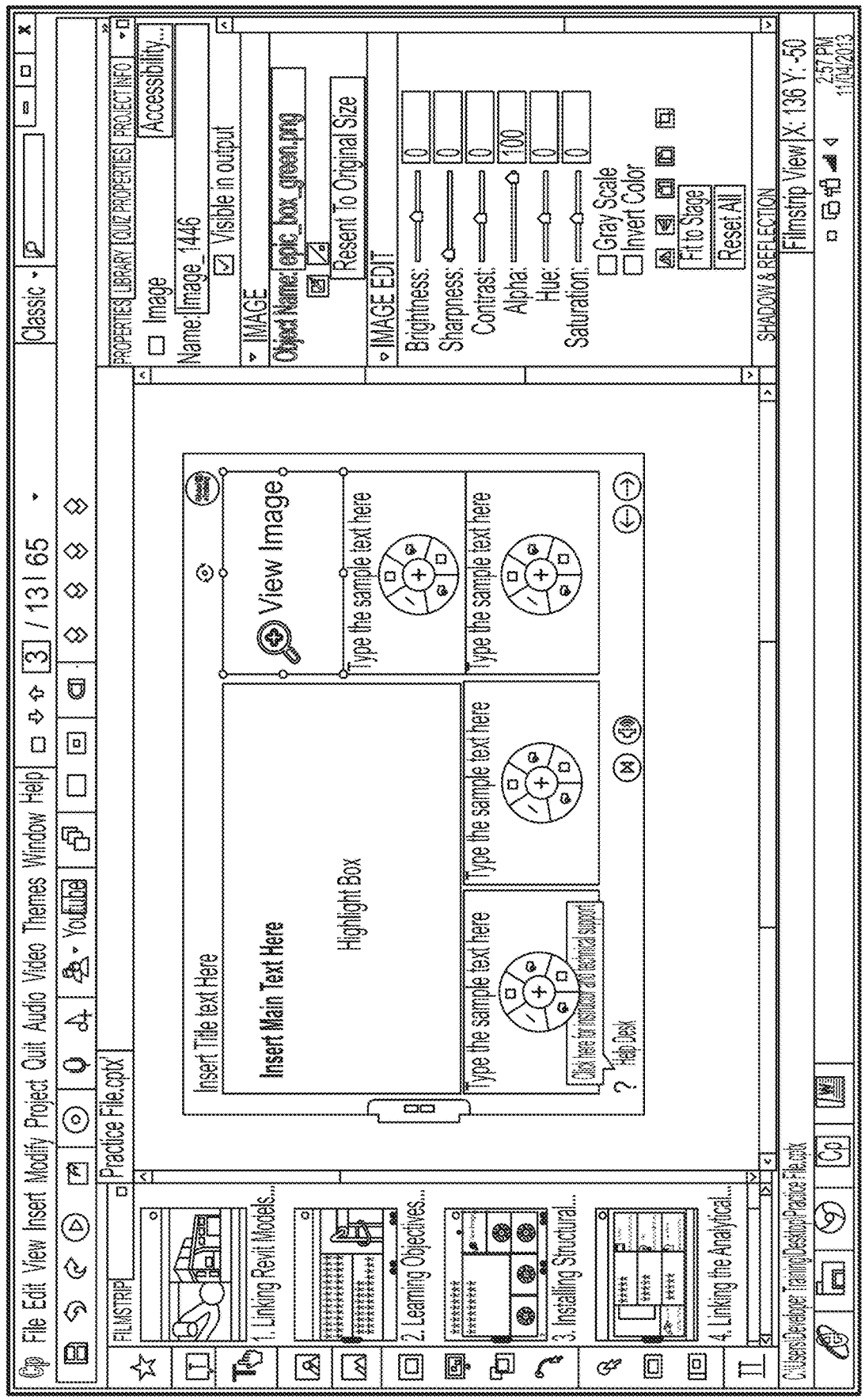

Media elements may also be added for developer access. For example, as shown in FIG. 12, by clicking on the view image option the user can select the color and placement (5 options) of the base layer image panel, the corresponding text title for the image and an upload function for depositing the images in the cloud repository. Restrictions may be placed on text length for field data to constrain text titles to a suitable number of characters. Images can also be checked prior to upload for the proper size, bit depth, and file type. This should eliminate the possibility of uploading non-usable file formats and images of sub-par quality.

Figure 13:
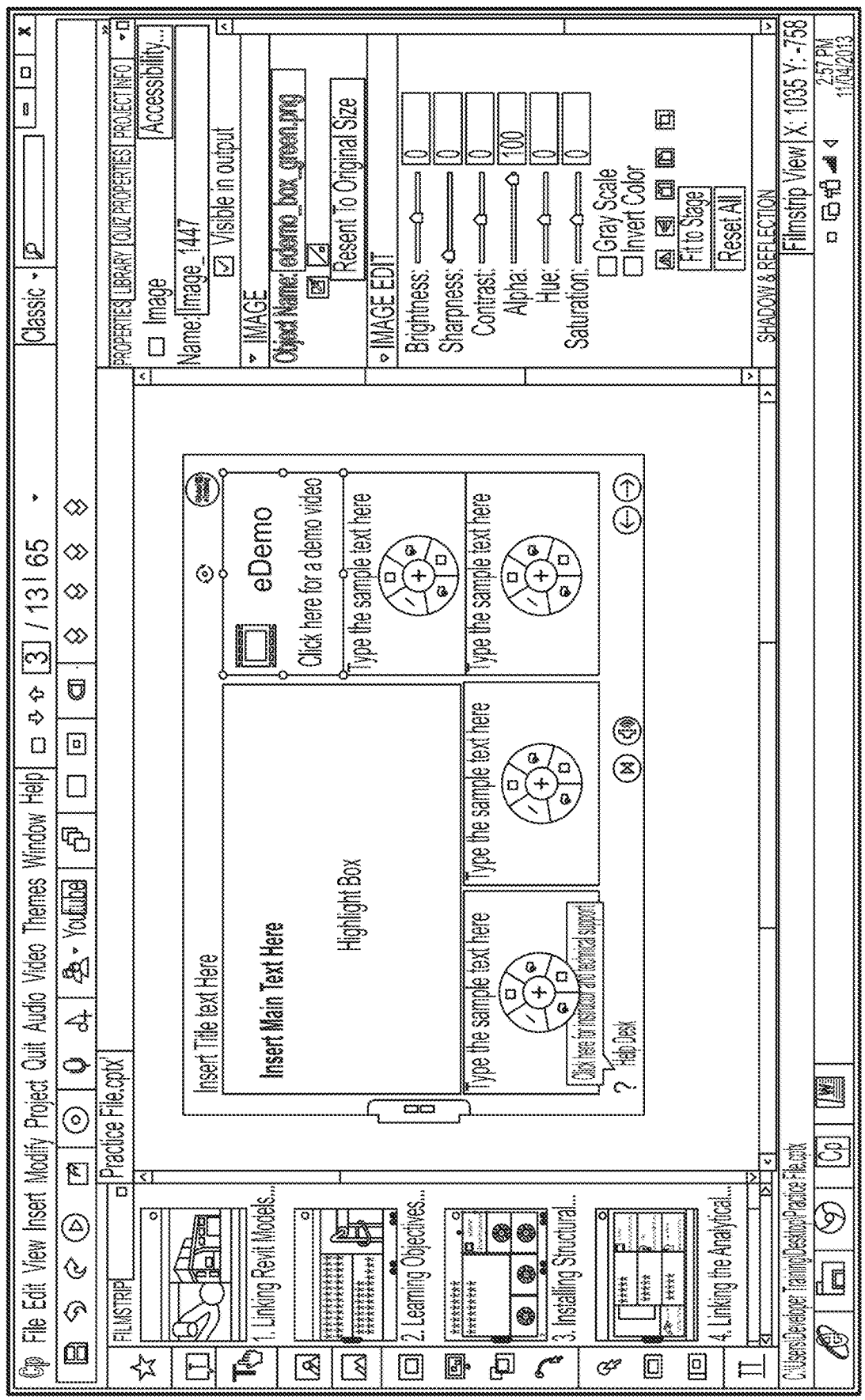

Turning now to FIG. 13, by clicking on the eDemo box, the user can pick the color and placement of the eDemo base layer and also present an extended length text field for pasting the eDemo URL. The URL field can be skipped if the URL is not ready when the storyboard is initially prepared. An option to select <skip this field> can be added so the developer knows for certain the URL is not ready and the missing link was not an oversight.

Figure 14:
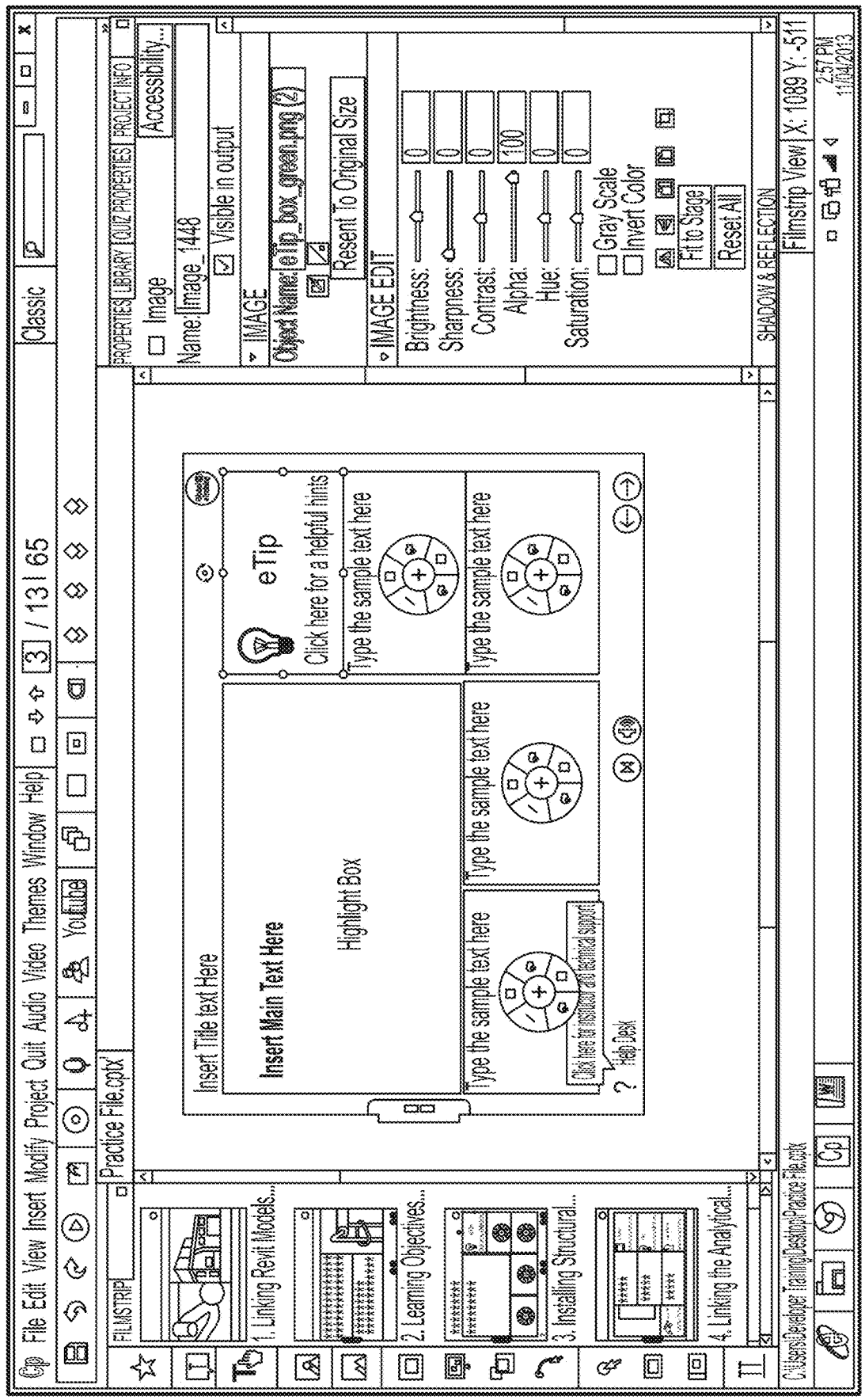
Figure 15:
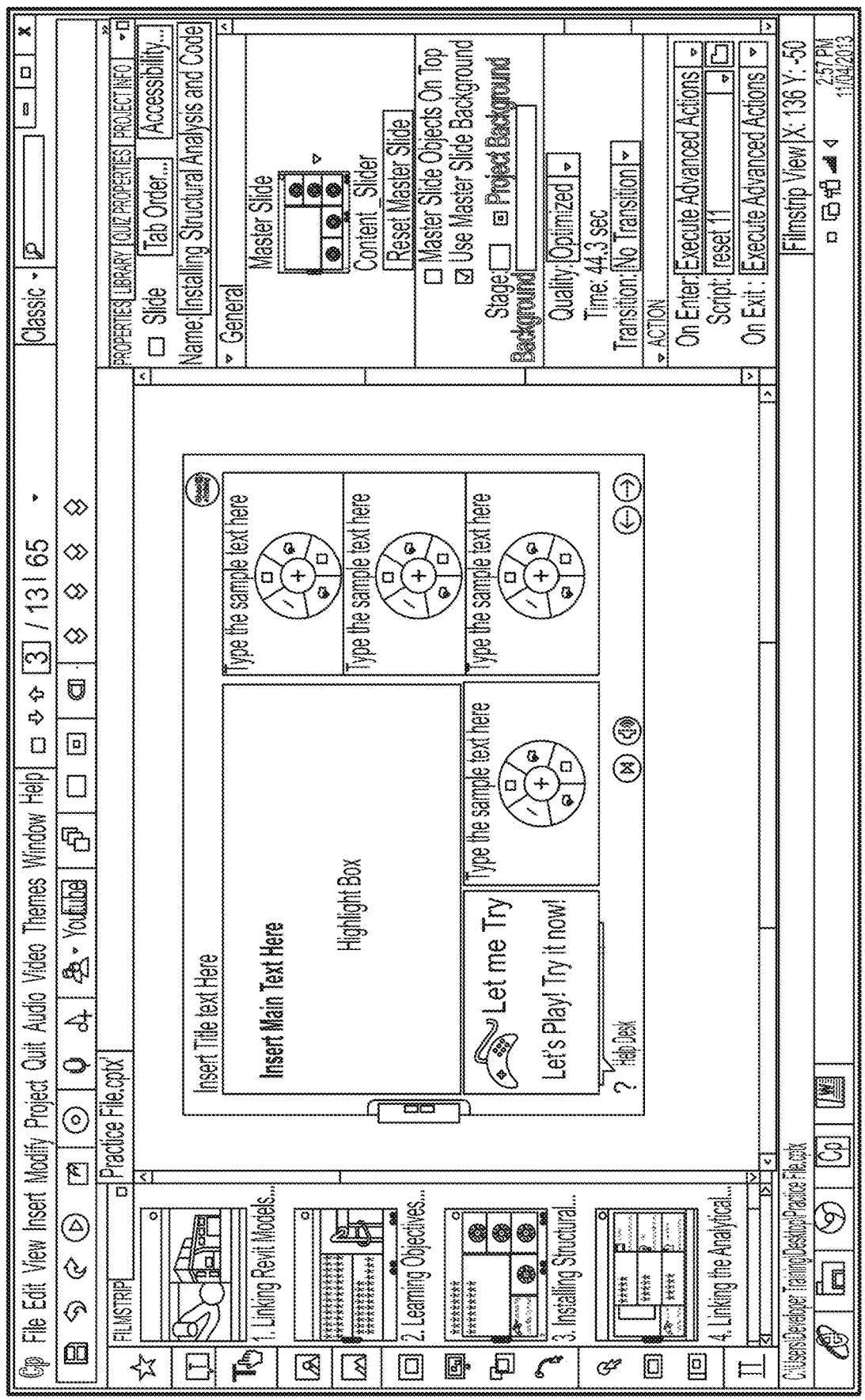
Figure 16:
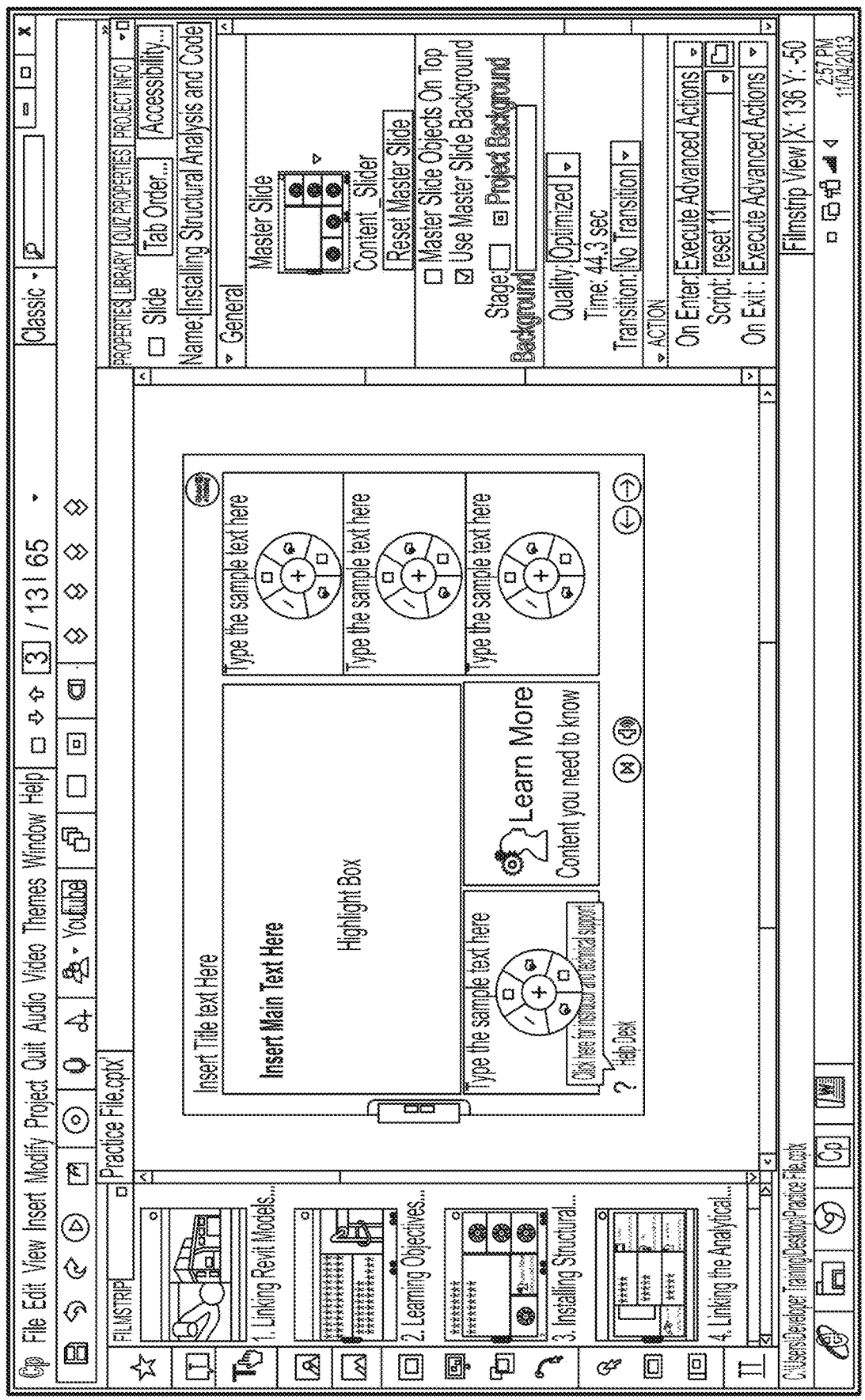
Figure 17:
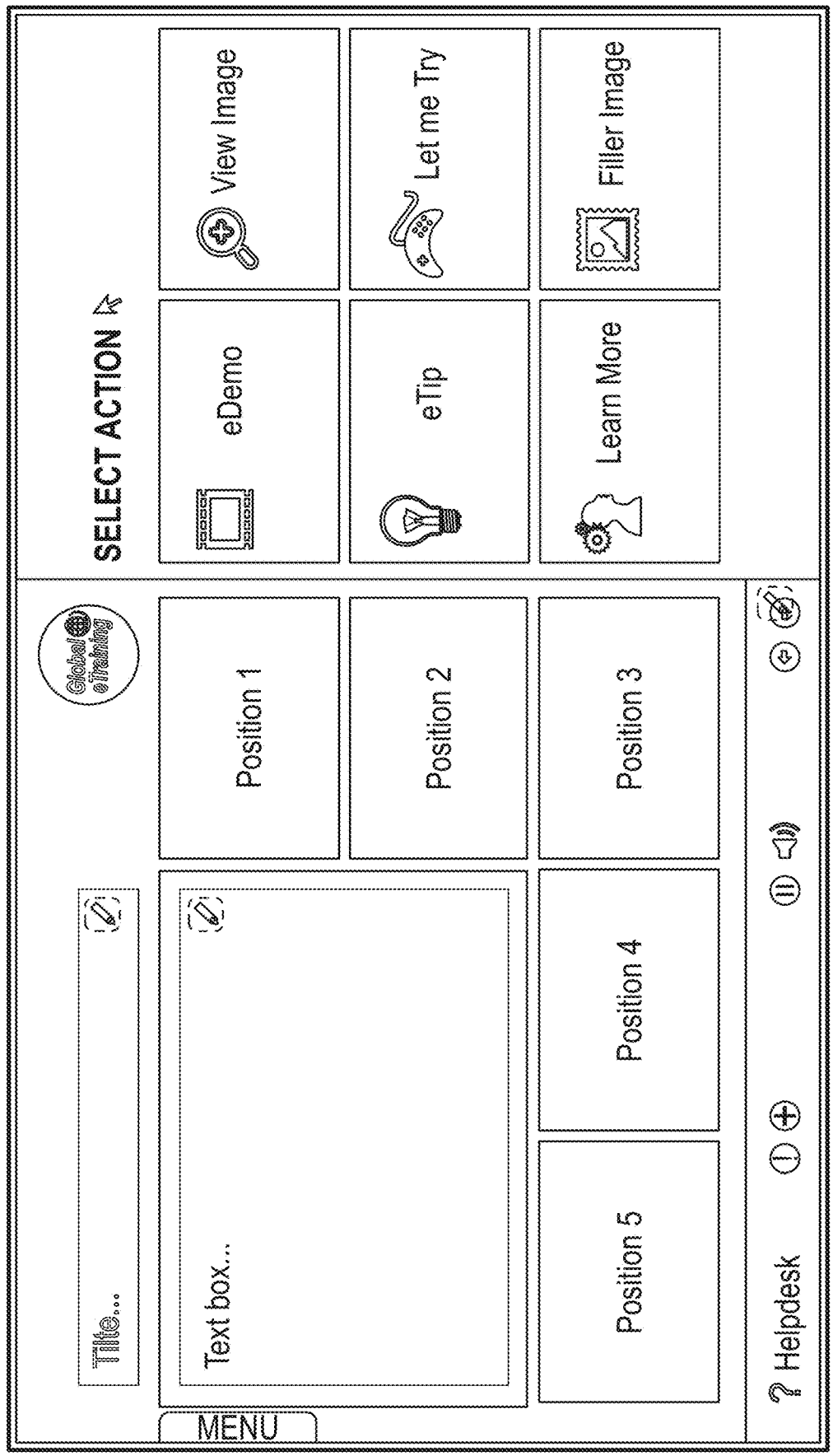
FIGS. 17 to 21 are example screen shot illustrating the addition of actions to a template.

By selecting the eTip box as shown in FIG. 14, the user can pick the color and placement of the eTip base layer. The base layer color will dictate the color of the eTip panel. The placement and size of the panel is predetermined. The user can paste the required text and select a number of images to be linked to the eTip panel, or a single image to be included on the panel. An upload field will be supplied for the required audio. As shown in FIG. 15, clicking the Let Me Try (LMT) option will allow the user to pick the color and placement of the LMT base layer. The user will also be presented with an extended length text field for pasting the LMT URL. Finally, as shown in FIG. 16, clicking the Learn More box allows the user to select the number and color of panels required. The user can paste the required text for each panel, and images that link from or should be embedded too each panel. An upload field will be supplied to attach audio for each panel if required. The embedding options can be left blank if no images or audio are required.

Figure 18:
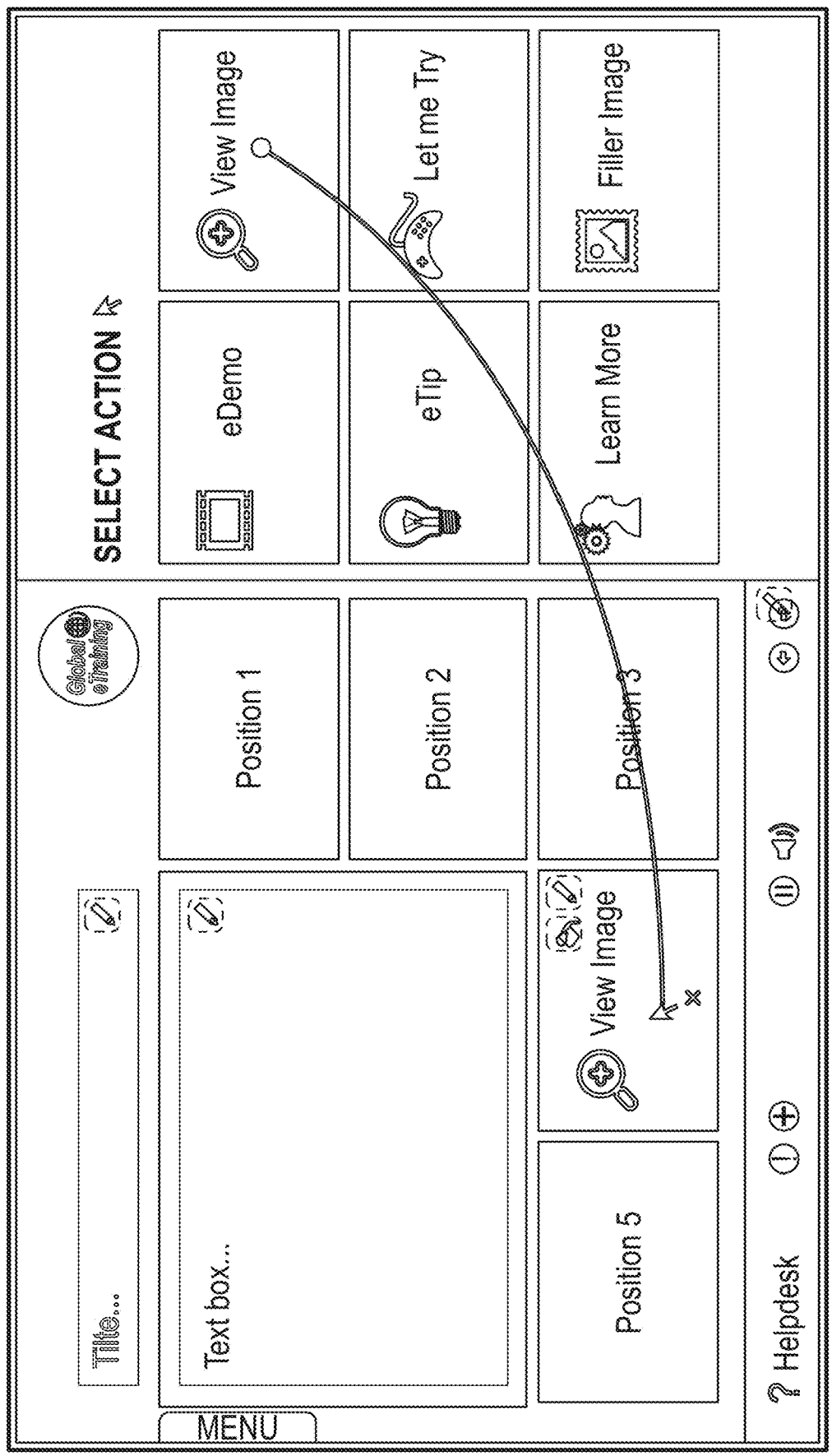
Figure 19:
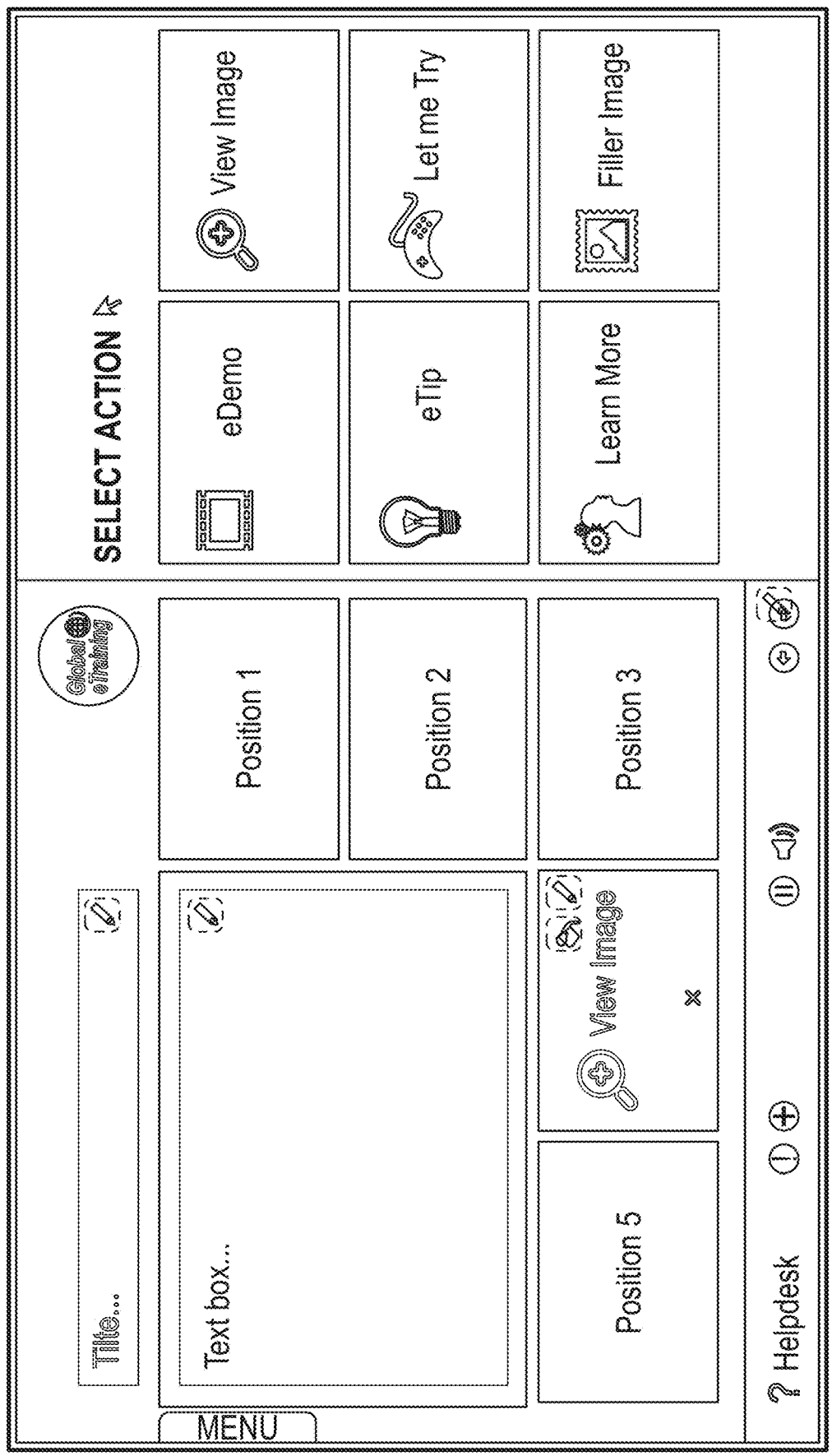
Figure 20:
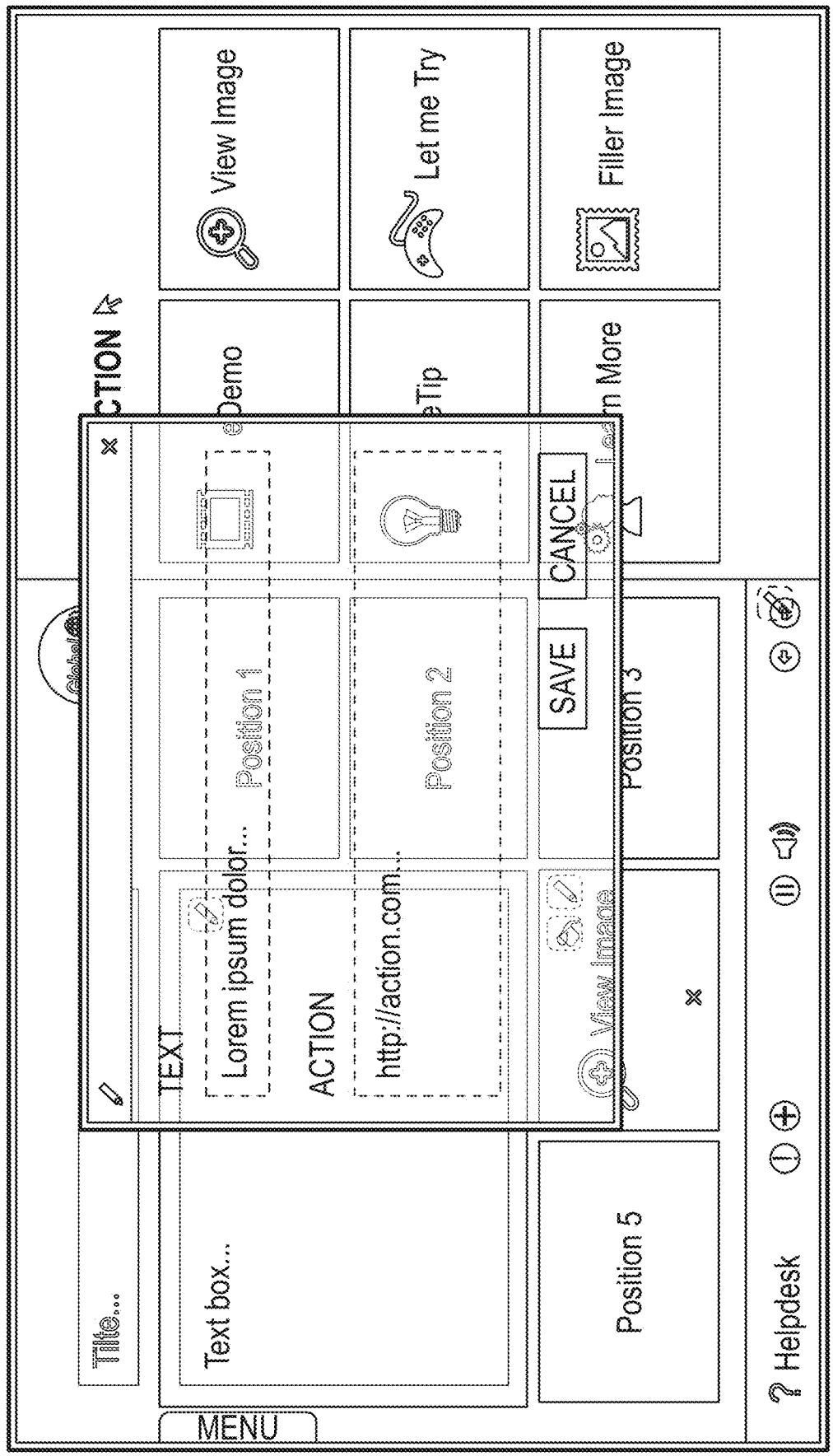
Figure 21:
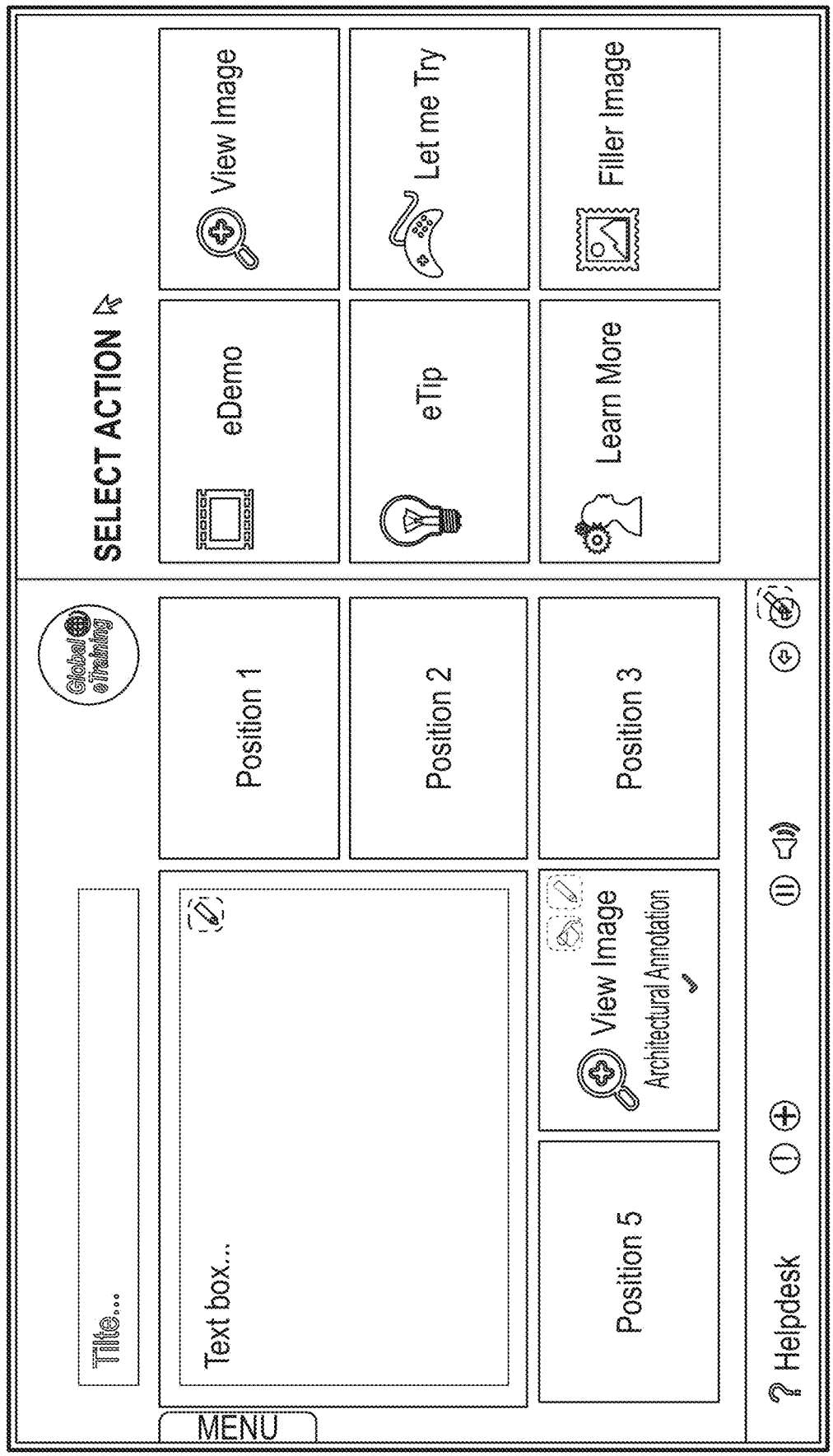

FIGS. 17 to 21 illustrate another configuration in which actions such as eDemo and eTip are provided in a side-pane and can be dragged and dropped into a desired position (see FIG. 18). Also, as shown in FIG. 20, text and specific actions can be specified using dialog boxes.

Various additional fields may be provided:

Color Palette Selection—The user can enter a number of color selections in the standard color number format. The developer will use these color variations to pre-build the base layers for the various launch panels.

Logo Selection—The user can upload a version of their logo. The general placement of the logo will be constrained to the upper right hand corner of the template, next to the GeT logo.

Help Desk—If required, the Help Desk logo can be changed to suit the requirements of the customer. An extended length text field will be provided to paste the URL of the Help Desk module.

Add Slide Button—Add a new blank slide in sequence.

Add Slide Audio—this can be a batch upload of multiple mp3 files in an archived folder.

An example course will now be described for illustrative purposes only.

Each course can be configured to comprise a variable number of Modules, or "Topics". Each Module includes a variable number of "Slides", or items within a Topic. For example, a "Slide" for this application is a screen laid out to an exact template, with 1 fixed location (the Text area), and 5 areas that are identical in size and shape, but which can be located in any arrangement on the "slide" in the remaining 5 areas.

For slide creation, the slide is associated with a course, and a Topic, and given the location in the sequence to be used. Once this information has been captured the process can proceed to the creation of the slide itself. For screen layout, the screen should be laid out in the same way on every "Slide". The basic screen items may include: Text Box, eDemo, View Image, Let me Try, eTip, Learn More, Audio Button in the Footer, etc.

For configuration buttons, each button can have a configuration hotspot that can be clicked on to bring up a configuration form. Such a form can include: Text Box, Text to display when the slide is shown, and Hotspot URL to link to if clicked; eDemo—Hotspot URL to link to if clicked; View Image—Hotspot URL to link to if clicked; Let me Try—Hotspot URL to link to if clicked; eTip—Hotspot URL to link to if clicked; Learn More—Hotspot URL to link to if clicked; and Audio Button in the Footer—Hotspot URL to link to if clicked.

Media items can be located anywhere—on the internal servers or links to external resources. If no Button is selected for a "slot", then a filler image should be used as a default display option (Client to specify filler images in various sizes). When a slide has been created, all of the above details are stored, and the system is then ready for the creation of the next slide. Slides can be edited and amended at any time.

Workflow Workbook

Figure 22:
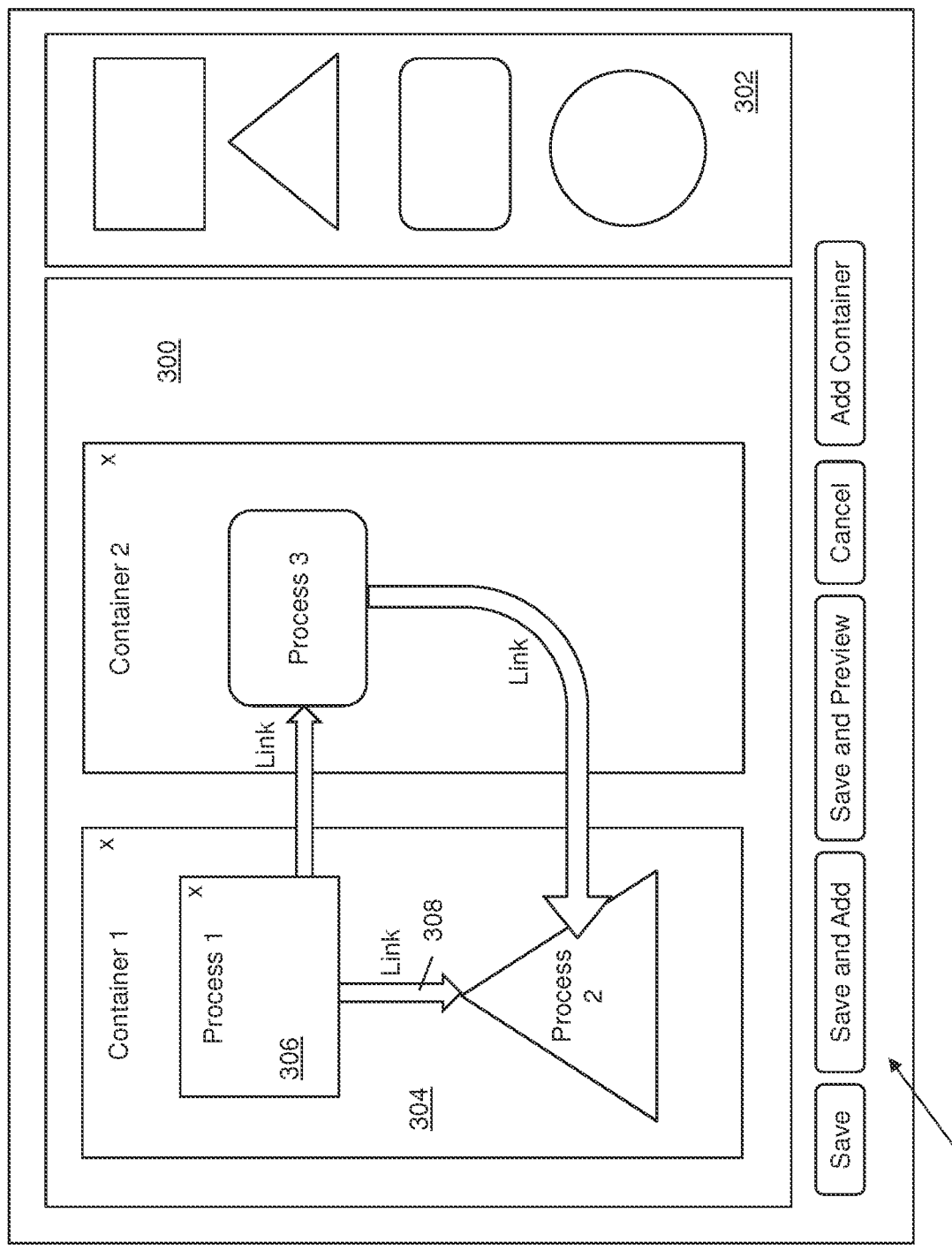
FIG. 22 is an example of a workflow generator user interface.
Figure 23:
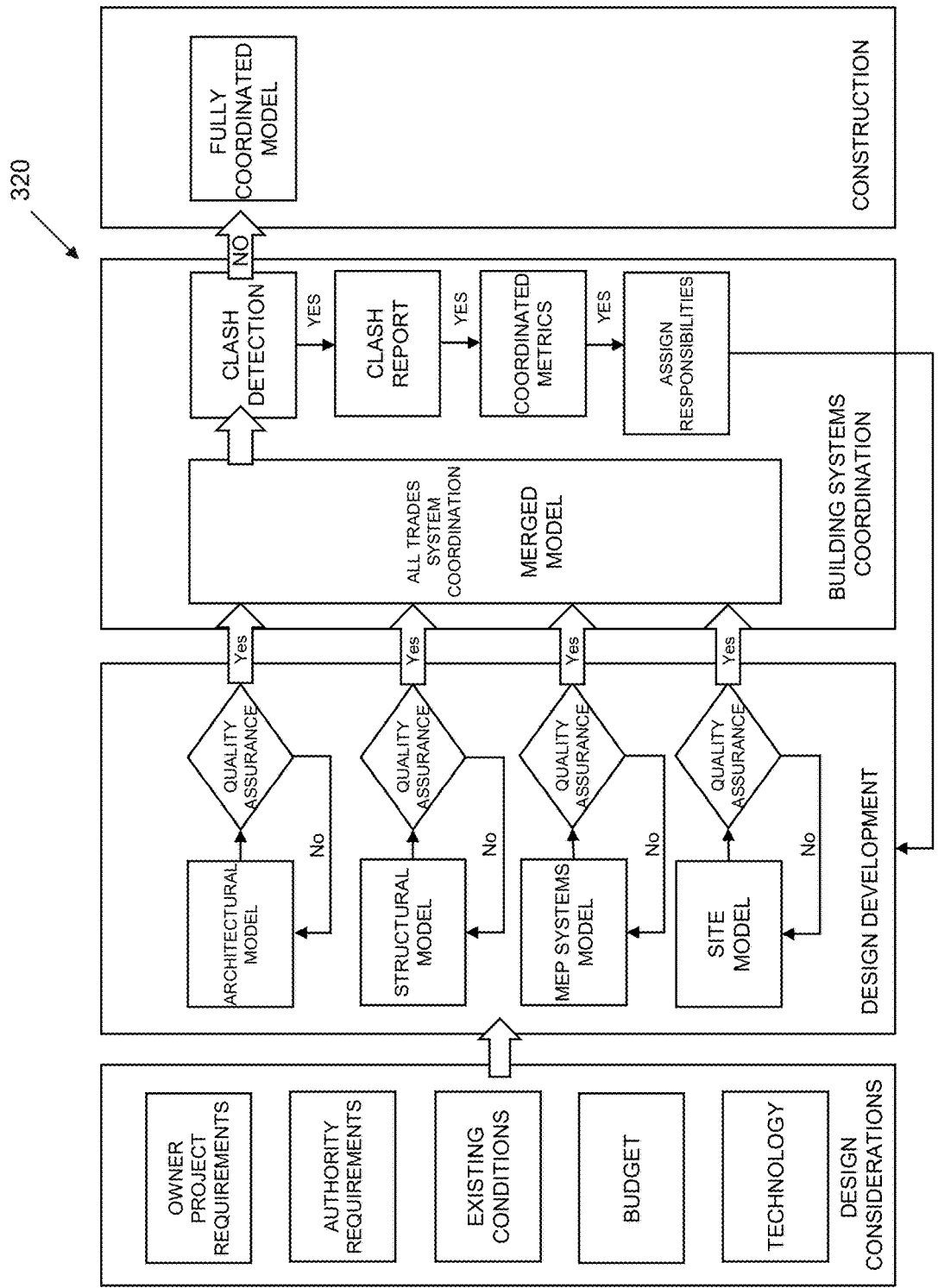
FIG. 23 is an example of a table of contents generated using the workflow generator user interface.

Turning now to FIGS. 22 and 23, an alternative workflow generator is shown, which can be used to index a new course (or other media presentation) in a non-linear fashion. For example, rather than generating a table of contents for an e-learning or e-training course that moves from one chapter or session to the next in succession, the workflow generator shown in FIG. 22 enables a flowchart-like table of contents to be generated such that a course can flow according to any logic without being bound to a linear index. FIG. 22 illustrates a workflow generator work area user interface 300 and a shape selector pane 302. The user interface 300 can be used to create a flow-chart-like index using the shapes, similar to generating a flow chart for a presentation or logic diagram. For example, a work-in-progress is shown in FIG. 22 in which a first container 304 is created, in which one or more shapes 306 can be added, similar to how a flow chart is built. One or more links 308 can also be created to dictate the flow from one process 306 to another. As also shown in FIG. 22, multiple containers 304 can be created for creating groupings of different shapes 302, e.g. to create a lesson or to show alignment between certain objects in the flow diagram, e.g., each shape may represent a department and the container may be a company. Within each shape 306, link 308 or container 304 (e.g. the objects shown in FIG. 22), items such as links (URLs), documents, media files, etc., can be added, similar to the above examples in FIGS. 1 to 21. Also, other flow charts can be embedded within a shape 306 to create multiple layers to a table of contents. In this way, a course or other media presentation can be created to flow in any flexible way that the creator (and/or collaborators) wish. Similar to the above examples, the workflow generator is provided in a cloud-based environment enabling collaboration amongst multiple users to dynamically create, edit and finalize the workflow for the media presentation.

Once the workflow is designed and completed, the result is typically a non-linear index, such as a table of contents 320 for an e-learning course, as shown in FIG. 23. By creating a flow chart, the non-linear nature of the presentation output can be visualized by the user.

Template Translation Tool

Figure 24:
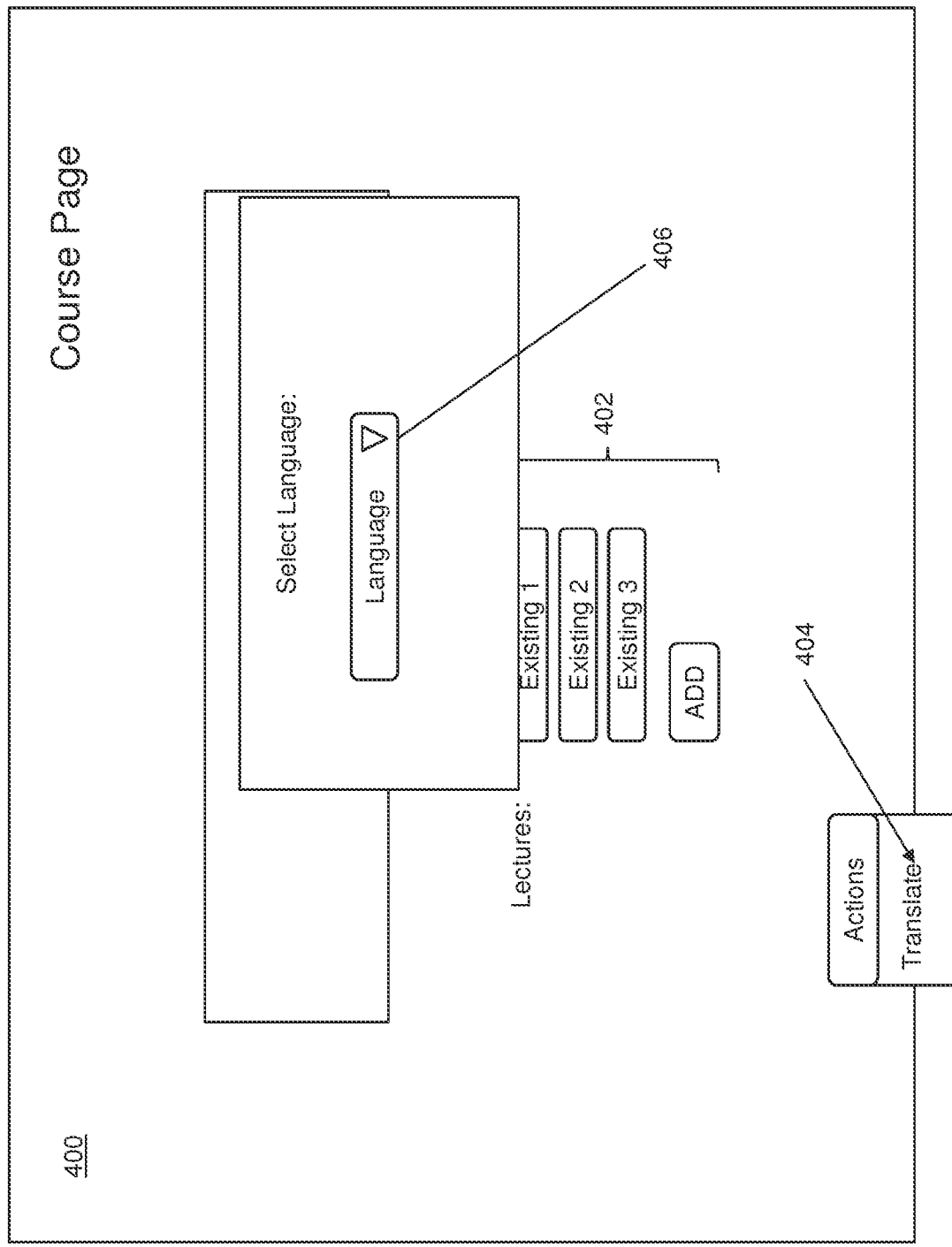
FIG. 24 is an example of a user interface for a course page illustrating a translation tool.

A generated media presentation such as an e-learning course may be desirable in multiple languages. For example, a course generated in English may wish to be translated into Japanese. FIG. 24 illustrates an example of a course page 400 for an e-learning course, which includes a number of lectures 402. The system 10 can be configured to utilize machine translation tools (proprietary or commercially available) to take a generated course and translate it into one or more other languages in order to offer the same course content in that other language. In the example shown in FIG. 24, an "actions" option includes a translate option 404 that can be applied to an entire course or a selected lecture or other portion. By selecting the translate option 404, a language selector 406 is displayed with a drop down list of available languages. By selecting a desired language, the cloud server 12 can utilize an available translation tool to translate textual content in the user interface for the course (i.e. based on what was generated using the template generator). If the available translation tools can translate audio, subtitles can also be generated for audio clips, videos, and narrations.

Figure 25:
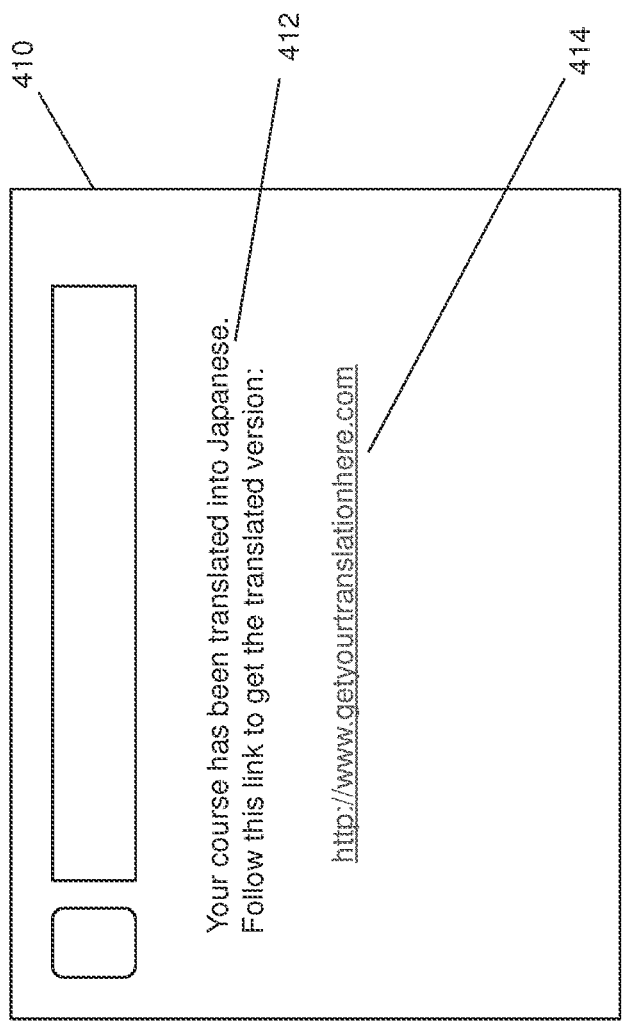
FIG. 25 is an example of a message indicating that a translation of a course content has been completed and providing a link to obtain the translated version.

After selecting the desired language, the cloud server can work independently to generate the translation, which could take some time depending on the amount of data to be translated. When completed, an email or other message 410 can be generated as shown in FIG. 25, with a message 412 indicating that the translation in the particular language is ready, and providing a link 414 to the translated version. By selecting the link, a translated course is displayed. The translated course can be in an editable format or can be considered ready to use with additional options for editing, as shown in FIG. 26. As shown in FIG. 26, an edit translation tool 500 can be provided to enable particular sections 502 of a course to be selected for individual editing by selecting a corresponding edit button 504.

The editing functionality can provide options to replace all instances throughout a course, for example, if a mistaken translation of a particular word or phrase is detected. The editing tool can also be used to allow editing crowdsourcing whereby after a translation is generated, the editing tool tracks edits that are made manually by a person due to a word being mis-translated by the system. The correct version can be saved and later used to override what the translation tool would normally output. When many users perform edits this allows the system to refine and improve the translations. This auto-correction option can be made optional and can vary based on the underlying subject matter being translated. For example, literary text may have different mistakes than technical text.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will also be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the cloud server 12, template generator 16, compiler 18, client device 26, any component of or related to the cloud server 12, template generator 16, compiler 18, client device 26, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of generating electronic content, the method comprising:
providing access to a predetermined template via a server application, the predetermined template specifying a layout for at least one slide to contain content;
enabling the content to be added to the template by a plurality of contributors, each contributor having access to a project utilizing the template by accessing the server application over a network;
receiving the content;
compiling a published output according to the received content and parameters of the predetermined template;
receiving over the network, feedback from a contributor of the plurality of contributors that contributed to the published output, the feedback comprising a request to change the predetermined template and metadata associated with the requested change;
processing the feedback to determine the associated metadata;
providing the associated metadata for the requested change to have the predetermined template revised based on the feedback;
obtaining a revised template; and
providing access to the revised template via the server application for subsequent use by the plurality of contributors.

2. The method of claim 1, further comprising having the feedback evaluated to determine revisions to the template.

3. The method of claim 1, further comprising generating a feedback report comprising the feedback and associated metadata.

4. The method of claim 1, further comprising enabling a flowchart-like table of contents in the template to be interacted with to generate the layout and to enable a course to flow according to logic associated with the flowchart-like table of contents without being bound to a linear index.

5. The method of claim 4, further comprising providing a tool to add one or more objects and links between the objects to a container to specify the flow between content elements.

6. The method of claim 5, further comprising enabling content items to be added within the one or more objects.

7. The method of claim 4, further comprising enabling another flow chart to be embedded within an object to generate multiple layers within the table of contents.

8. The method of claim 1, further comprising providing the content to a machine translation tool to translate the content into one or more other languages to generate the published output in a plurality of languages.

9. The method of claim 8, further comprising, responsive to an input specifying a selected language, have the server application determine an available translation tool to translate textual portions of the content.

10. The method of claim 8, further comprising:
initiating a translation process independently of publishing the output;
receiving a notification of the translation outcome; and
enabling access to a translated course upon completion.

11. The method of claim 10, further comprising enabling the translated course to be edited prior to enabling access.

12. The method of claim 8, further comprising providing an editing tool to enable translated content to be edited.

13. The method of claim 12, further comprising enabling the editing to be crowdsourced by tracking edits that are manually edited to correct mis-translated content.

14. The method of claim 12, further comprising saving a correct version based on the editing to be saved as an override for subsequent uses of the machine translation tool.

15. The method of claim 14, further comprising providing an auto-correction option based on the saved corrected versions.

16. The method of claim 12, wherein the edits are included in the feedback metadata.

17. The method of claim 1, wherein the predetermined template specifies a predetermined layout for each slide and a presentation workflow for the plurality of slides to control the structure and functionality of the predetermined template and to guide contributors that provide the content into adding contributor content to the predetermined template in a way that follows a methodology or process and ties the predetermined layout and presentation workflow to a desired learning objective or outcome by inhibiting changes to the predetermined layout of a slide and inhibiting changes to the presentation workflow of the plurality of slides.

18. The method of claim 1, wherein the metadata associated with the proposed change comprises an explanation of the proposed change.

19. A non-transitory computer readable storage medium comprising computer executable instructions for generating electronic content, comprising instructions for:
   providing access to a predetermined template via a server application, the predetermined template specifying a layout for at least one slide to contain content;
   enabling the content to be added to the template by a plurality of contributors, each contributor having access to a project utilizing the template by accessing the server application over a network;
   receiving the content;
   compiling a published output according to the received content and parameters of the predetermined template;
   receiving over the network, feedback from a contributor of the plurality of contributors that contributed to the published output, the feedback comprising a request to change the predetermined template and metadata associated with the requested change;
   processing the feedback to determine the associated metadata;
   providing the associated metadata for the requested change to have the predetermined template revised based on the feedback;
   obtaining a revised template; and
   providing access to the revised template via the server application for subsequent use by the plurality of contributors.

20. A server comprising a processor, memory, a server application, and a communication connection, the memory comprising computer executable instructions for causing the processor to generate electronic content by:
   providing access to a predetermined template via a server application, the predetermined template specifying a layout for at least one slide to contain content;
   enabling the content to be added to the template by a plurality of contributors, each contributor having access to a project utilizing the template by accessing the server application over a network;
   receiving the content;
   compiling a published output according to the received content and parameters of the predetermined template;
   receiving over the network, feedback from a contributor of the plurality of contributors that contributed to the published output, the feedback comprising a request to change the predetermined template and metadata associated with the requested change;
   processing the feedback to determine the associated metadata;
   providing the associated metadata for the requested change to have the predetermined template revised based on the feedback;
   obtaining a revised template; and
   providing access to the revised template via the server application for subsequent use by the plurality of contributors.

* * * * *